(12) United States Patent
Steinhagen et al.

(10) Patent No.: US 11,980,832 B2
(45) Date of Patent: *May 14, 2024

(54) DEVICE AND METHOD FOR THE CONTINUOUS HIGH-PRESSURE TREATMENT OF BULK MATERIAL AND USE THEREOF

(71) Applicants: UHDE HIGH PRESSURE TECHNOLOGIES GMBH, Hagen (DE); thyssenkrupp AG, Essen (DE)

(72) Inventors: Volkmar Steinhagen, Hagen (DE); Ansgar Herber, Dortmund (DE)

(73) Assignees: UHDE HIGH PRESSURE TECHNOLOGIES GMBH, Hagen (DE); thyssenkrupp AG, Essen (DE)

( * ) Notice: Subject to any disclaimer, the term of this patent is extended or adjusted under 35 U.S.C. 154(b) by 215 days.

This patent is subject to a terminal disclaimer.

(21) Appl. No.: 17/415,942

(22) PCT Filed: Dec. 20, 2019

(86) PCT No.: PCT/EP2019/086659
§ 371 (c)(1),
(2) Date: Jun. 18, 2021

(87) PCT Pub. No.: WO2020/127957
PCT Pub. Date: Jun. 25, 2020

(65) Prior Publication Data
US 2022/0062788 A1    Mar. 3, 2022

(30) Foreign Application Priority Data

Dec. 21, 2018 (DE) .................... 10 2018 222 874.4
Dec. 21, 2018 (DE) .................... 10 2018 222 883.3

(51) Int. Cl.
*A23F 5/24* (2006.01)
*B01D 11/02* (2006.01)
(Continued)

(52) U.S. Cl.
CPC ...... *B01D 11/0246* (2013.01); *B01D 11/0203* (2013.01); *B01D 11/0207* (2013.01);
(Continued)

(58) Field of Classification Search
CPC ........... B01D 11/0246; B01D 11/0203; B01D 11/0207; B01D 11/0219; B01D 11/0226;
(Continued)

(56) References Cited

U.S. PATENT DOCUMENTS 2,156,236 A * 4/1939 Bonotto ............. B01D 11/0246
422/273
2,292,716 A    8/1942 Pyzel
(Continued)

FOREIGN PATENT DOCUMENTS

CN    1671905 A    9/2005
CN    1827201 A    9/2006
(Continued)

OTHER PUBLICATIONS

English Translation of International Search Report issued in PCT/EP2019/086659, dated Dec. 7, 2020.

*Primary Examiner* — Joseph W Drodge
(74) *Attorney, Agent, or Firm* — thyssenkrupp North America, LLC

(57) ABSTRACT

An apparatus and method of high pressure treatment of bulk material by extraction and/or impregnation may involve treating bulk material in an internal volume of a pressure vessel apparatus at a high pressure level in a range from 40 to 1000 bar under isolation from the environment. The high pressure treatment may be performed charge-wise in a
(Continued)

closed system in the pressure vessel apparatus in that the bulk material is supplied charge-wise to the internal volume with the pressure vessel apparatus closed and is positioned in at least one treatment plane. Upon completion of the high pressure treatment, the bulk material is discharged charge-wise from the internal volume with the pressure vessel apparatus closed. This also gives advantages in terms of handling, especially also with regard to material flow, and with regard to operational reliability.

15 Claims, 15 Drawing Sheets

(51) Int. Cl.
| | |
|---|---|
| *B01J 3/00* | (2006.01) |
| *B01J 8/10* | (2006.01) |
| *B01J 13/00* | (2006.01) |
| *B01J 19/20* | (2006.01) |
| *C08J 11/08* | (2006.01) |
| *C12C 3/10* | (2006.01) |

(52) U.S. Cl.
CPC ...... *B01D 11/0219* (2013.01); *B01D 11/0226* (2013.01); *B01D 11/0234* (2013.01); *B01D 11/0238* (2013.01); *B01D 11/0253* (2013.01); *B01D 11/0284* (2013.01); *B01D 11/0288* (2013.01); *B01J 3/008* (2013.01); *B01J 8/10* (2013.01); *B01J 13/0091* (2013.01); *B01J 19/20* (2013.01); *C08J 11/08* (2013.01); *A23F 5/24* (2013.01); *C08J 2300/14* (2013.01); *C08J 2300/30* (2013.01); *C12C 3/10* (2013.01)

(58) Field of Classification Search
CPC ............ B01D 11/0234; B01D 11/0238; B01D 11/0253; B01D 11/0284; B01D 11/0288; B01D 11/0257; B01D 11/0242; B01D 11/028; B01D 11/04; B01D 11/0403; B01D 11/0488; B01D 11/0492; B01J 3/008; B01J 8/10; B01J 13/0091; B01J 19/20; B01J 3/006; B01J 3/02; B01J 3/04; B01J 3/06; B01J 19/18; B01J 19/1812; B01J 2219/00162; B01J 2219/00164; B01J 2219/00166; B01J 2219/00477; B01J 2219/00601; B01J 2219/0068; B01J 2219/00686; B01J 2219/00761; B01J 2219/00891; B01J 2219/00905; B01J 2219/32203; B01J 2219/32206; B01J 2219/32213; B01J 2219/32231; B01J 2219/32237; C08J 11/08; C08J 2300/14; C08J 2300/30; A23F 5/24; C12C 3/10
See application file for complete search history.

(56) References Cited

U.S. PATENT DOCUMENTS

| | | | |
|---|---|---|---|
| 2,539,732 A | | 1/1951 | Donohue |
| 2,664,967 A | | 1/1954 | Molstedt |
| 2,729,550 A | | 1/1956 | Maycock et al. |
| 2,893,945 A | | 7/1959 | Berg |
| 3,131,202 A | | 4/1964 | Depmer |
| 3,826,737 A | * | 7/1974 | Pegels .................... C10G 35/12 208/143 |
| 3,894,128 A | | 7/1975 | Hirao et al. |
| 3,958,952 A | * | 5/1976 | van Ginneken ....... B01J 8/0278 422/616 |
| 4,039,424 A | * | 8/1977 | Hyde .................... C10G 1/042 208/50 |
| 4,229,418 A | * | 10/1980 | Wijffels ................. B01J 8/0278 422/607 |
| 4,258,011 A | | 3/1981 | Prazmowski |
| 4,601,906 A | | 7/1986 | Shindler |
| 4,778,588 A | | 10/1988 | Brandes et al. |
| 5,290,950 A | | 3/1994 | Raban |
| 5,290,959 A | | 3/1994 | Rice |
| 5,382,414 A | | 1/1995 | Lautenschlager |
| 5,456,385 A | | 10/1995 | Poussin |
| 5,688,473 A | | 11/1997 | Lawrence et al. |
| 6,048,494 A | | 4/2000 | Annapragada |
| 6,569,313 B1 | | 5/2003 | Carroll et al. |
| 7,897,050 B2 | | 3/2011 | Waibel |
| 11,612,831 B2 | * | 3/2023 | Steinhagen ........ B01D 11/0203 426/425 |
| 2008/0300386 A1 | | 12/2008 | Lazarev et al. |
| 2011/0226608 A1 | | 9/2011 | Lautenschläger |
| 2016/0030860 A1 | | 2/2016 | McGhee |
| 2016/0114304 A1 | | 4/2016 | Li |
| 2016/0270416 A1 | | 9/2016 | Corey |
| 2017/0246557 A1 | | 8/2017 | Skell |
| 2017/0291120 A1 | | 10/2017 | Jackson |
| 2018/0030372 A1 | | 2/2018 | Maki et al. |
| 2018/0257048 A1 | | 9/2018 | Webster et al. |
| 2020/0261875 A1 | * | 8/2020 | Plais ...................... B01J 8/025 |
| 2022/0072447 A1 | * | 3/2022 | Steinhagen ............. B01J 3/008 |

FOREIGN PATENT DOCUMENTS

| | | |
|---|---|---|
| CN | 104780988 A | 7/2015 |
| DE | 864 309 C | 1/1953 |
| DE | 865 505 C | 2/1953 |
| DE | 878 188 C | 6/1953 |
| DE | 71 03 843 U | 2/1971 |
| DE | 3815726 A1 | 11/1989 |
| DE | 42 16 295 A | 11/1993 |
| DE | 199 46 146 A | 4/2001 |
| DE | 20119064 U1 | 5/2002 |
| DE | 20201949 U1 | 5/2002 |
| DE | 699 07 217 T2 | 3/2004 |
| DE | 102008039106 A1 | 3/2010 |
| DE | 202017007003 U1 | 3/2019 |
| EP | 0 222 207 A | 5/1987 |
| EP | 0 683 804 B | 4/2001 |
| EP | 1 681 387 A1 | 7/2006 |
| EP | 1701775 B1 | 9/2006 |
| EP | 1 725 706 B | 5/2012 |
| JP | 01293129 A | 11/1989 |
| JP | 1293129 A | 11/1989 |
| JP | 2005-533937 A | 11/2005 |
| KR | 2010 0086297 A | 7/2010 |
| NL | 47 526 C | 8/1939 |
| NL | 47526 C | 12/1939 |
| WO | 9922837 A1 | 5/1999 |
| WO | 2004105927 A2 | 12/2004 |
| WO | 10032260 A1 | 3/2010 |
| WO | 2017124106 A1 | 7/2017 |
| WO | 2019/122387 A | 6/2019 |

\* cited by examiner

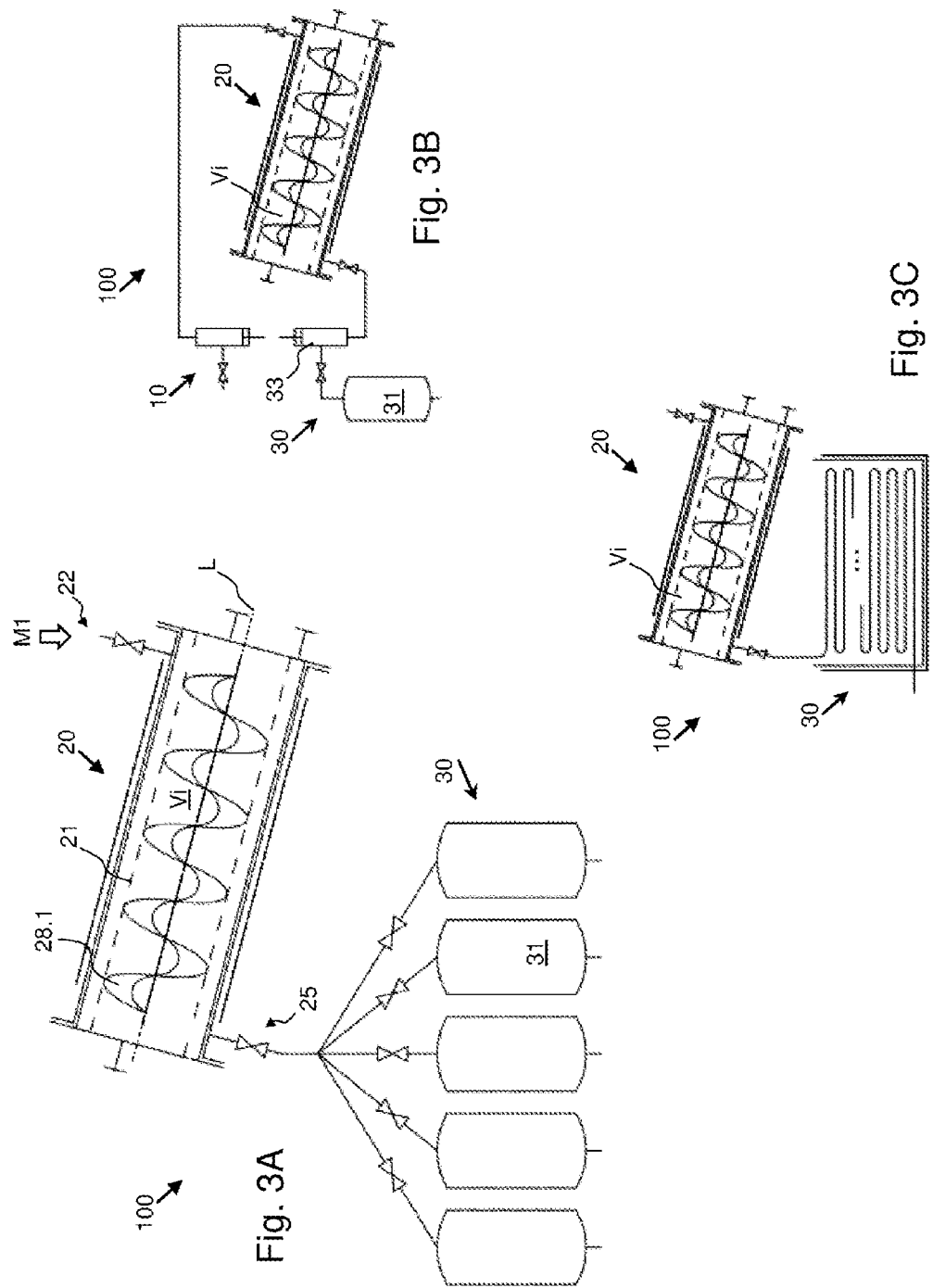

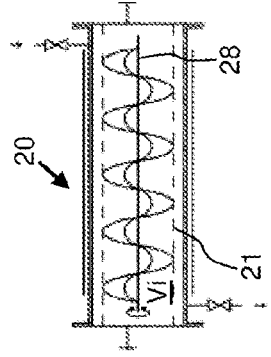
Fig. 4A
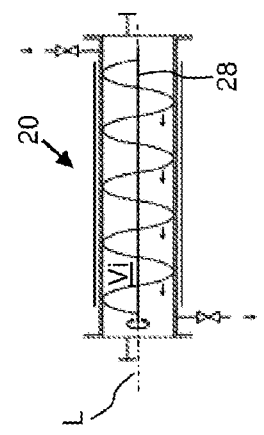
Fig. 4B
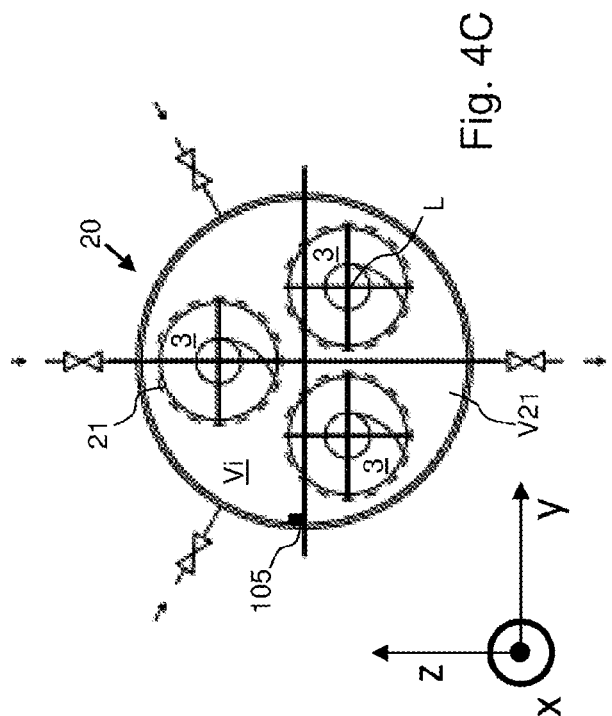
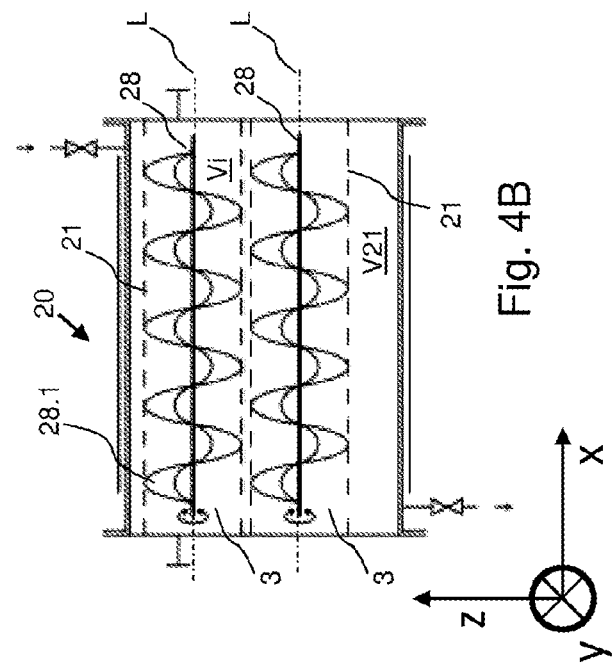
Fig. 4C

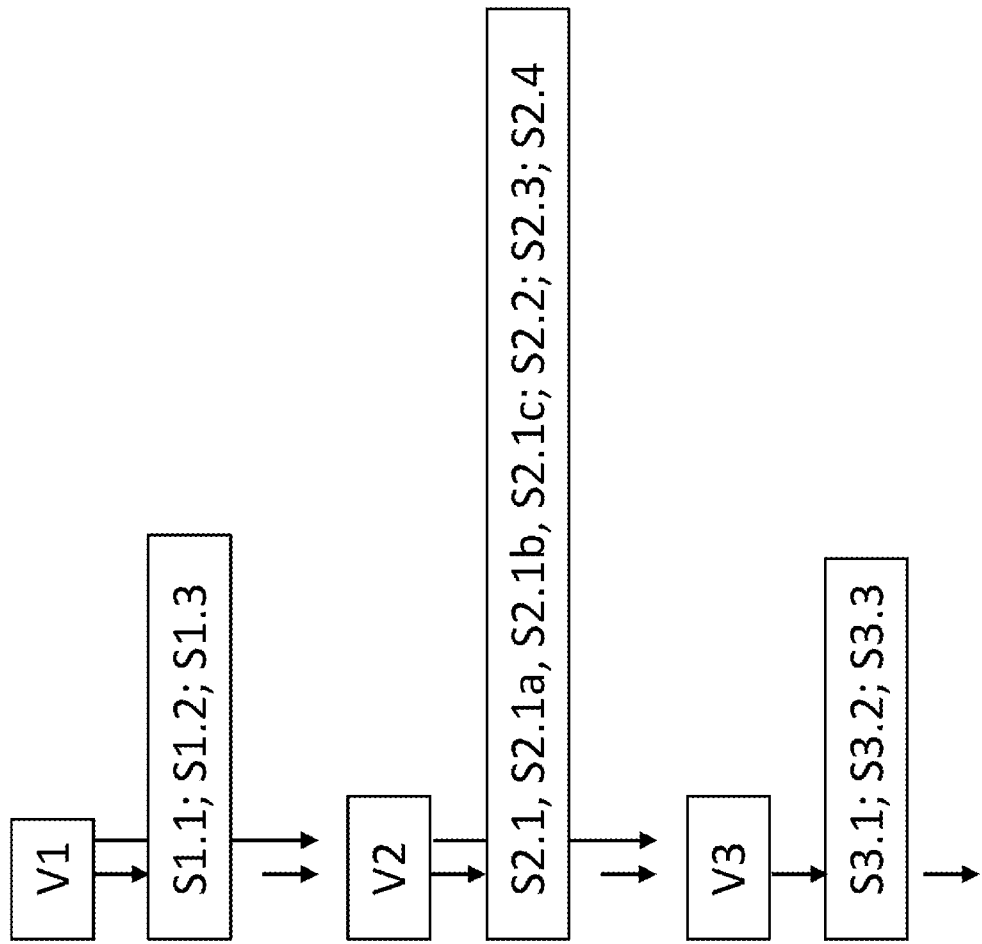

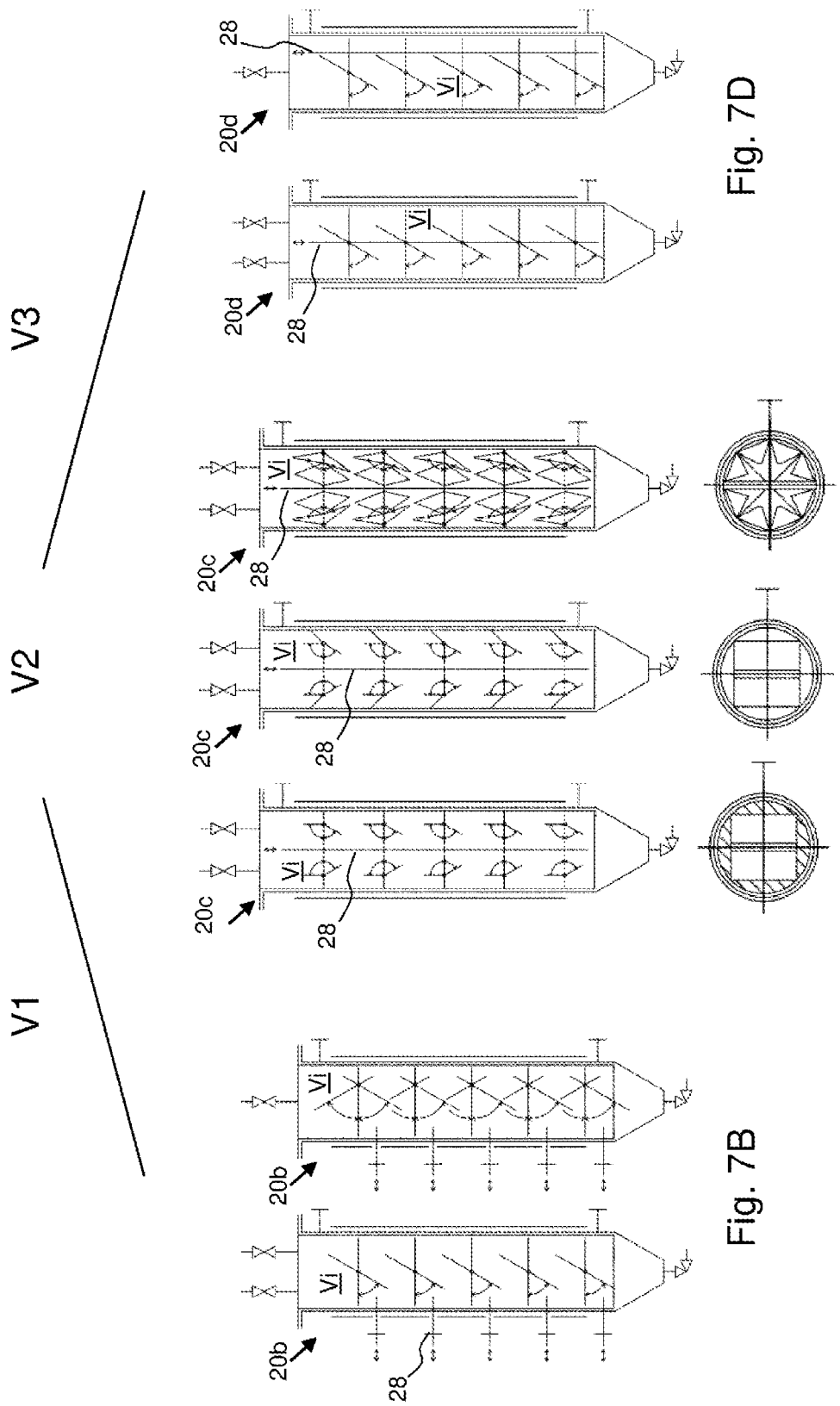

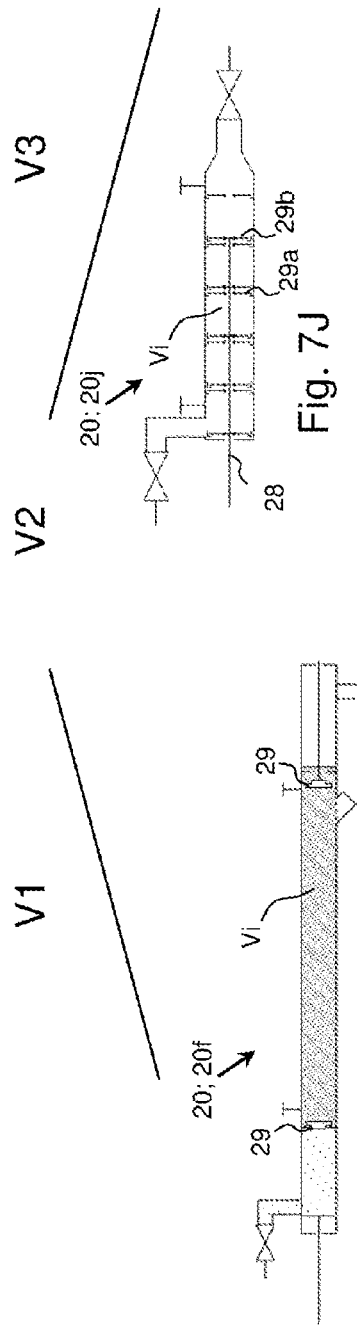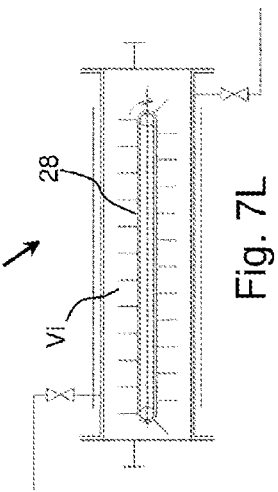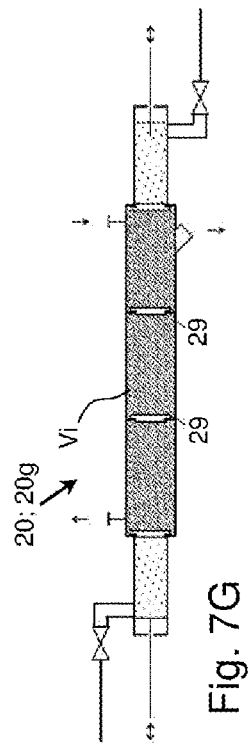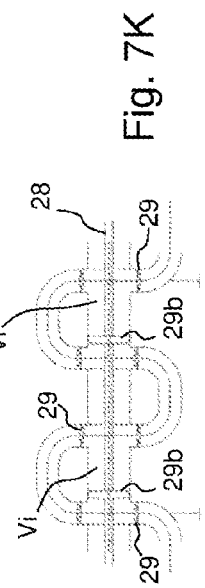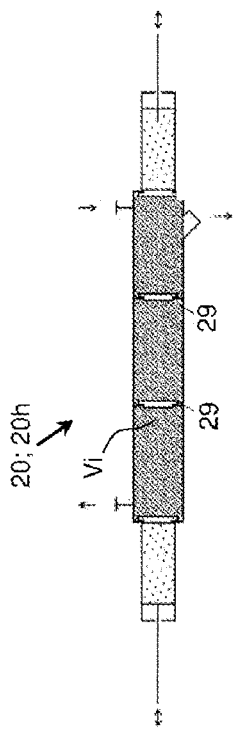

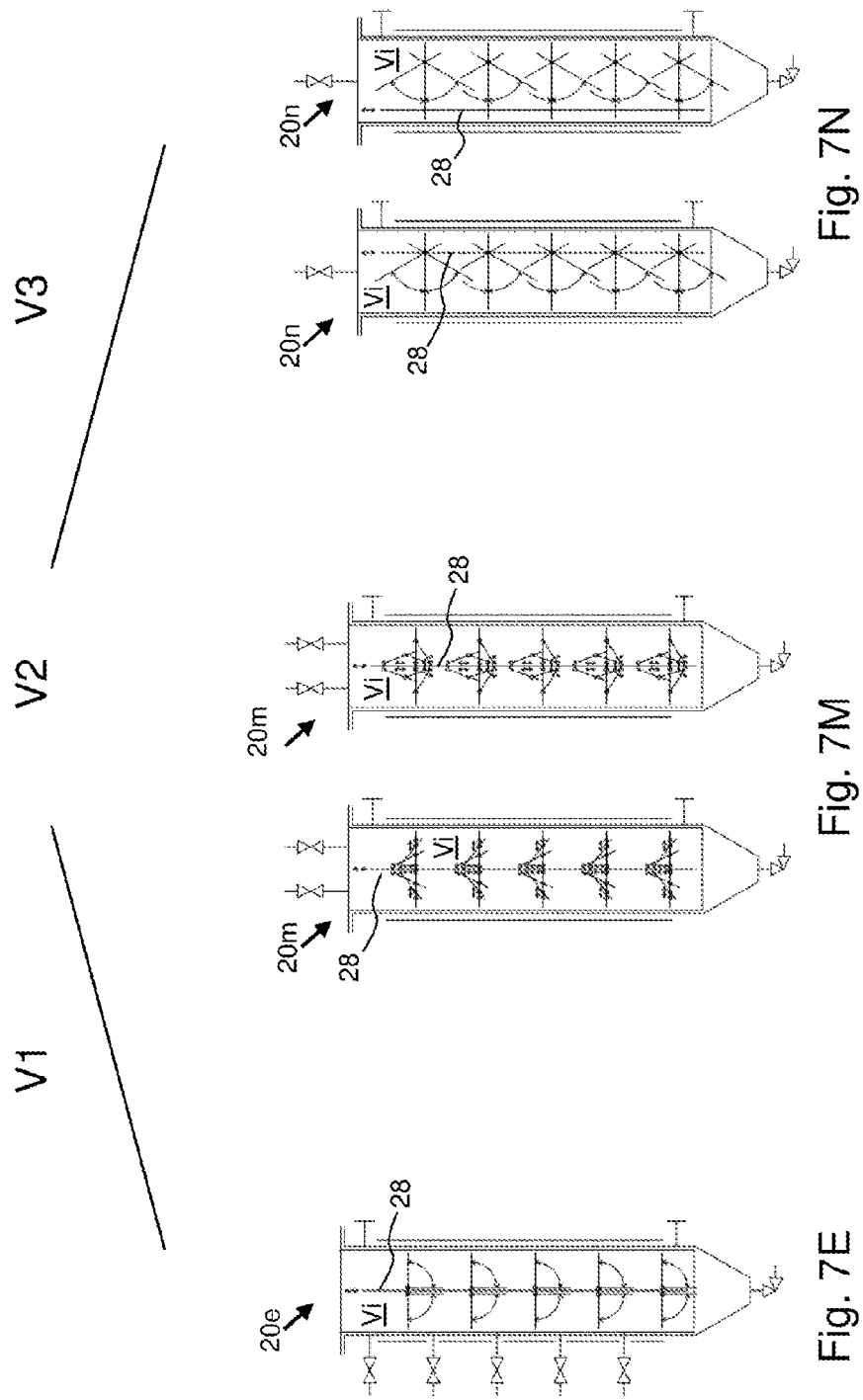

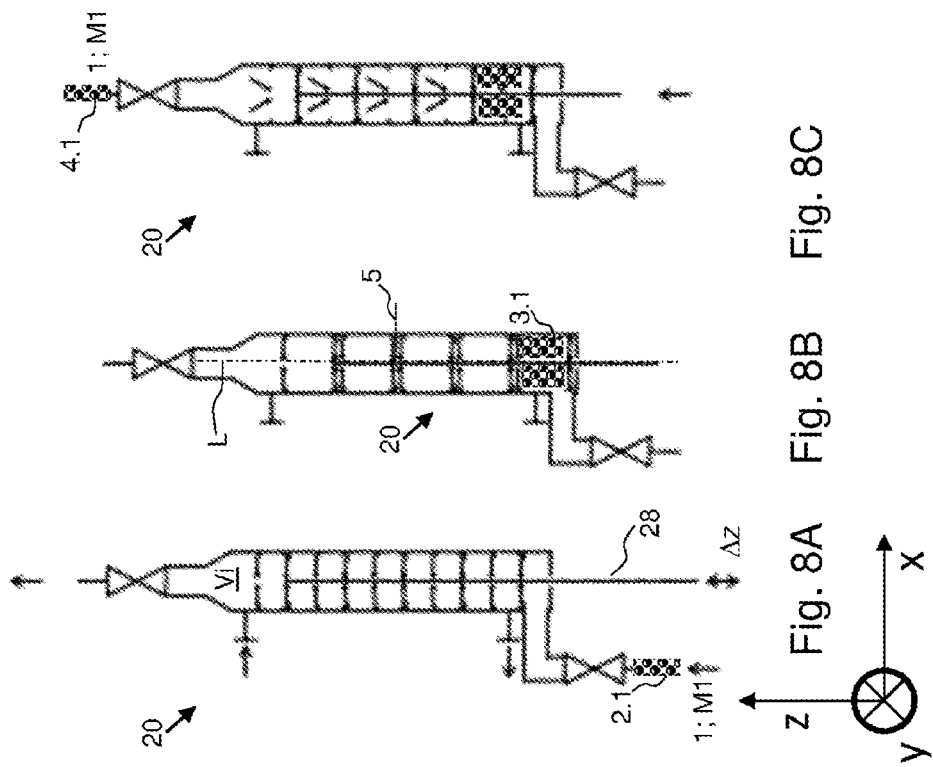

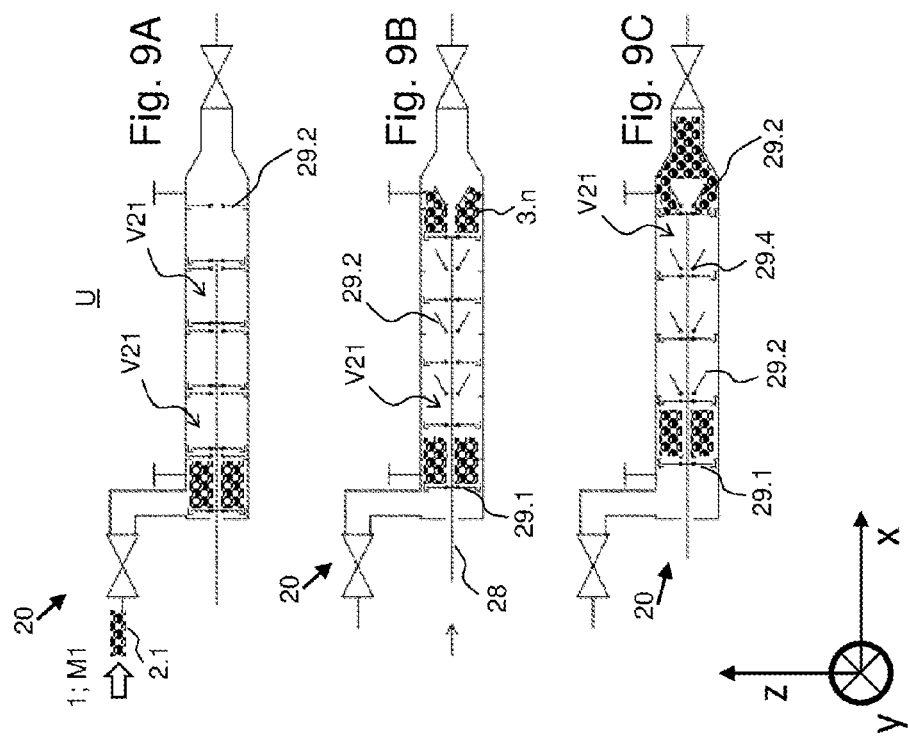

DEVICE AND METHOD FOR THE CONTINUOUS HIGH-PRESSURE TREATMENT OF BULK MATERIAL AND USE THEREOF

The invention relates to an apparatus for and to a method of continuous high pressure treatment of bulk material, especially by extraction and/or impregnation. The invention especially relates to the use of a pressure vessel apparatus having at least one actuator for adjusting the material flow in the continuous high pressure treatment of bulk material. The invention especially relates to an apparatus and to a method, each according to the preamble of the respective independent claim.

CROSS REFERENCE TO RELATED APPLICATIONS

This application is a U.S. National Stage Entry of International Patent Application Serial Number PCT/EP2019/086659, filed Dec. 20, 2019, which claims priority to German Patent Application No. DE 10 2018 222 874.4, filed Dec. 21, 2018 and German Patent Application No. DE 10 2018 222 883.3, filed Dec. 21, 2018, the entire contents of which are incorporated herein by reference.

FIELD

The present disclosure generally relates to apparatuses and methods for the continuous high-pressure treatment of bulk material, including by extraction and/or impregnation.

BACKGROUND

In many cases, it is necessary to free bulk materials, especially in the form of granules, of substances, especially solvents. According to the application, the bulk materials are also subjected to a mere extraction without occurrence of solvents. The extraction can advantageously be effected under high pressure, especially at pressures above 100 bar, especially in conjunction with heating at an elevated temperature generated in a controlled manner. It is known that an extraction, especially extraction of solvent(s), can in many cases be effected preferentially with use of supercritical fluids or extraction media (e.g. carbon dioxide $CO_2$, propane, butane), especially since surface forces or surface tensions can be minimized here and the extraction is particularly effective, even with regard to a drying effect. Starting materials that may be subjected here to an extraction include both liquids (fluids in the liquid phase, especially also viscous fluids) and solids. Either the bulk material subjected to high pressure treatment (also referred to as raffinate in this state) or extracts obtained by extraction may be referred to as the product of high pressure treatment according to the application.

Prominent examples of extraction methods are the decaffeination of tea leaves, coffee beans or else extraction of hops. Since extraction is connected to the production of various intermediate user and end user products, especially also from the foods sector, there is also a comparatively high number of variants of extraction methods. This is also reflected in the different variants with regard to construction and in the spectrum of size of the plants. It is not unusual, for example, to implement an extraction column having a height of more than 10 m, or to connect multiple extractors (pressure vessels) to one another to form a plant. In any case, a wide range of variation can be observed in the existing plant concepts, even with regard to variations in size.

For impregnation methods, whether they be performed separately or in combination with extraction, comparable examples can be enumerated.

To date, extraction, especially extractive solvent removal, in the case of bulk material or in the case of granules, has in many cases been effected by arranging the bulk material in an extractor (pressure vessel), especially in a layer with a defined maximum bed height, which layer is contacted with extraction medium (especially $CO_2$) that flows through it. The purpose of arrangement of the bulk material within the high pressure treatment volume (i.e. in the accommodation cavity for the granules defined by the pressure vessel) is typically served by a basketlike insert, which is also referred to as product accommodation basket, for example with a volume of about 250 liters and with a cylindrical outer wall, with a filter plate which is gas-permeable, in the form of wire braids, in the form of a perforated plate or manufactured from sintered metal, on which the insert basket is supported in the extractor. A filter lid of the basket may likewise be gas-permeable, in the form of wire braids, in the form of a perforated plate or manufactured from sintered metal. The basketlike insert may be inserted into the extractor in the region of a lid thereof and, after the extraction, the bulk material that has been largely freed of solvent can be transported away for further use by removal of the basketlike insert. The next charge can then be disposed in the extractor by means of the same insert or a further basketlike insert. In other words: the high pressure treatment method is performed chargewise, and the basketlike insert is also intended to facilitate the handling of the respective charge.

The manner of extractive solvent removal that has been customary to date requires a comparatively high level of labor and time. The handling of the basketlike insert cannot be automated in a simple manner. If the bulk material is hazardous, or if media or solvents that are combustible or harmful to health are used, a considerable level of expenditure is additionally also necessary with regard to safety, especially occupational safety or explosion protection, not least since personnel having specialist knowledge typically have to be involved for manual operations.

A disadvantage of existing apparatuses and methods is not just the handling of the bulk material (material flow) but also the dusts or gases that form, especially explosive gas mixtures, and impairments to the health of personnel involved. There is therefore an interest in simplifying high pressure treatment methods for bulk materials, especially for large amounts of bulk material, especially for extraction and/or impregnation.

JP 1293129 A describes a high pressure process wherein a reservoir vessel and a collecting vessel facilitate the chargewise provision of bulk material in the high pressure chamber, wherein the bulk material slides chargewise through a high pressure treatment chamber in a gravity-driven manner depending on the supply and discharge.

CN 1827201 A describes a high pressure treatment method in which the high pressure vessel is conveyed through a kind of airlock.

DE 42 16 295 A1 describes a method of high pressure treatment in which a vessel open on both sides is used, wherein a translational movement of a piston and multiple chamber regions ensure an advantageous throughput and an advantageous process regime.

EP 1 725 706 B1 describes the transfer of pretreated solids in suspension form to a high pressure stage.

Thus, a need exists for an apparatus and a method, with which the high pressure treatment of bulk material can be simplified and the apparatus- or method-related complexity associated with high pressure treatment can be reduced, especially with maximum efficiency of the method (throughput per unit time). Such apparatuses and methods should also take account of aspects of occupational safety and risks to health. A need also exists for a high pressure treatment method of maximum (time) efficiency, specifically in the case of extraction, especially extraction of solvent(s), and/or in the case of impregnation, each in the case of quite different types of bulk material, in spite of any optimization methods with regard to efficient high pressure treatment (so as to maximize throughput) that can assure maximum variability.

BRIEF DESCRIPTION OF THE FIGURES

FIG. 3A is a schematic cross-sectional side view of a working example of a high pressure treatment arrangement.

FIG. 3B is a schematic cross-sectional side view of another working example of a high pressure treatment arrangement.

FIG. 3C is a schematic cross-sectional side view of still another working example of a high pressure treatment arrangement.

FIG. 4A is a schematic cross-sectional side view of a working example of a pressure vessel apparatus of a high pressure treatment arrangement.

FIG. 4B is a schematic cross-sectional side view of another working examples of a pressure vessel apparatus of a high pressure treatment arrangement.

FIG. 4C is a schematic cross-sectional side view of a further working examples of a pressure vessel apparatus of a high pressure treatment arrangement.

FIG. 6 is a schematic diagram depicting individual steps of an example method.

FIGS. 7B, 7C, 7D, 7E, 7F, 7G, 7H, 7J, 7K, 7L, 7M, 7N, and 7O are cross-sectional side, detail views of different example pressure vessel apparatuses of high pressure treatment arrangements.

FIGS. 8A, 8B, 8C, 8D, 8E, and 8F are cross-sectional side, detail views representing successive states of operation or process stages of example pressure vessel apparatuses of high pressure treatment arrangements.

FIGS. 9A, 9B, 9C, 9D, and 9E are cross-sectional side views representing successive states of operation or process stages of example pressure vessel apparatuses of high pressure treatment arrangements.

DETAILED DESCRIPTION

Figure 1A:
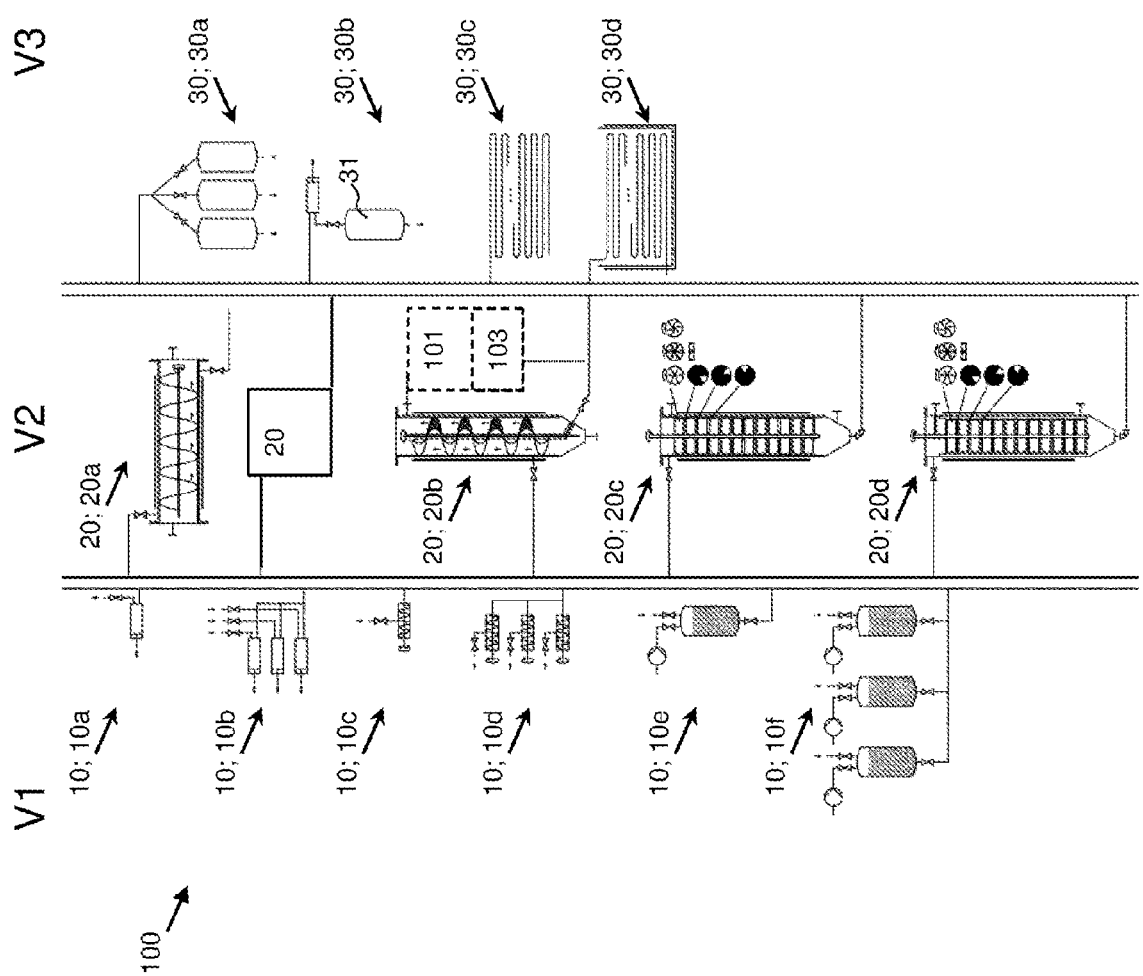
FIG. 1A is a schematic view or an at least partial cross-sectional side view of an overview of individual variants of a first, second, and third step sequence and the apparatuses provided for the purpose according to a first working example.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to an apparatus for and to a method of continuous high pressure treatment of bulk material, especially by extraction and/or impregnation. The present disclosure generally relates to the use of a pressure vessel apparatus having at least one actuator for adjusting the material flow in the continuous high pressure treatment of bulk material.

In some examples, a method of high pressure treatment of bulk material by extraction and/or impregnation may involve disposing bulk material in the high pressure treatment volume of a pressure vessel apparatus and treating the bulk material at a high pressure level, especially high pressure in the range from 40 to 1000 bar, under isolation from the environment. The method comprises at least the three following step sequences that are each controllable individually (especially with regard to material flow): pressurization V1, high pressure treatment V2, depressurization V3.

What is proposed in accordance with the invention is that the high pressure treatment in the second step sequence V2 is performed in a continuous manner at the high pressure level in a closed system in the high pressure treatment volume, wherein the high pressure treatment volume or the entire pressure vessel apparatus is/remains (static) in a fixed arrangement during the high pressure treatment, wherein the continuity of the high pressure treatment or of the high pressure treatment step sequence is assured solely by means of the one (single) high pressure treatment volume Vi, and wherein the bulk material is conveyed through the high pressure treatment volume during the high pressure treatment by means of a rotational actuating movement or as a function of at least one translational actuating movement, especially by continuous or discontinuous displacement of a single charge or a multitude of batches. This enables simplifications in the process regime and can also ensure advantages with regard to a high throughput of bulk material (output volume). Advantages also arise specifically with regard to material flow of bulk materials of highly variable volume, especially also in the case of increases in volume by a factor in the range of 10, for example specifically in the case of drying.

A/the rotational actuating movement is preferably effected by rotation of a rod or shaft or similar rotary driving means disposed within the high pressure treatment volume (optionally fed through the wall of the pressure vessel apparatus), and is effected about at least one longitudinal axis or actuation axis of the pressure vessel apparatus which is disposed centrally or eccentrically within the internal volume. It is optionally possible for multiple rotational actuating movements to be effected about multiple actuation axes. It is optionally possible to ensure a material flow of one or more charges through the overall high pressure treatment volume by means of a respective actuating movement. It is optionally possible, by means of a respective actuating movement, to ensure a material flow of a multitude of batches through a section along the material flow pathway through the high pressure treatment volume. The rotational actuating movement here may be a continuous and/or an at least partly cyclical actuating movement. The (respective) rotational actuating movement may be defined uniformly for the overall high pressure treatment volume, and/or be defined at least intermittently and in each case specifically for individual predefinable high pressure treatment planes.

A/the translational actuating movement is preferably effected by translation of a rod or similar driving means disposed within the high pressure treatment volume (optionally fed through the wall of the pressure vessel apparatus), in particular along at least one longitudinal axis or actuation axis of the pressure vessel apparatus which is disposed centrally or eccentrically within the internal volume. It is optionally possible for multiple translational actuating movements to be effected. It is optionally possible to ensure a material flow of one or more charges through the overall high pressure treatment volume by means of a respective actuating movement. It is optionally possible, by means of a respective actuating movement, to ensure a material flow of a multitude of batches through a section along the material flow pathway through the high pressure treatment volume. The translational actuating movement here may be a continuous and/or an at least partly cyclical actuating movement. The (respective) translational actuating movement may be defined uniformly for the overall high pressure treatment volume, and/or be defined at least intermittently and in each case specifically for individual predefinable high pressure treatment planes.

It is possible here for the step sequences of pressurization V1 and depressurization V3 to be each controlled individually in a batch/chargewise manner for individual bulk material batches/charges as discontinuous processes, at least with regard to bulk material flow and/or pressure level, i.e. for them to be controllable separately from the continuous high pressure treatment and individually, especially independently of the material flow and high pressure conditions in the second step sequence V2. The discontinuous process regime (upstream and downstream of the high pressure treatment) may also comprise a pressurization and depressurization for individual batches of bulk material, where the size of the respective batch is independent of a charge or batch treated in the second step sequence.

The high pressure range from 40 to 1000 bar may also be differentiated further, according to the application. In particular, an advantageous high pressure range may be restricted to 40 to 400 bar or 50 to 300 bar and/or to 650 to 1000 bar. At particularly high pressures, it is especially also possible to adjust or vary the solution properties of the extraction medium. Advantages in terms of process technology may especially also arise in the high pressure range from 100 to 250 bar, especially 100 to 200 bar. It is optionally also possible to establish a pressure range below or above a critical point of an extraction medium used (for example $CO_2$).

The extraction medium used may either be a pure substance or else a substance mixture, especially in the case of process parameters above the critical point of the substance or above a critical line for a two-substance mixture or above a critical surface of a substance mixture composed of more than two substances (especially three-substance mixtures).

The examples of extraction elucidated hereinafter, synonymously with an extraction of solvents, may also refer to an extraction of substances (loading) other than solvents.

A continuous high pressure treatment is understood here to mean a high pressure treatment in which no process interruption resulting from pressure fluctuations and/or resulting from material flow is required for the high pressure treatment of the bulk material, but in which, instead, the high pressure treatment at the high pressure level can optionally be performed continuously in an unchanged manner without interruption and (at least theoretically) without time limitation and (at least theoretically) without restriction in terms of the amount (mass, volume) of the bulk material treated, especially also in the case of continuous material flow within the high pressure treatment volume. In the case of continuous high pressure treatment, it is possible at any desired juncture to ensure the high pressure desired or required, especially also independently of preparatory and subsequent step sequences. There is no need to lower the high pressure level; more particularly, there is no need to lower the high pressure level in order to be able to ensure the flow of bulk material. The material flow may optionally be ensured here by continuous displacement, especially of at least one overall charge (no distinction between individual batches along the material flow pathway within the high pressure treatment volume), or by discontinuous displacement of an individual charge or of batches, especially in individual sections of the material flow pathway within the high pressure treatment volume. Any fluctuations in pressure are for technical reasons, for example as a result of the supply and/or the discharge of material. The continuous high pressure treatment may optionally also include the adjustment/control of a temperature level which is kept constant (as well as possible according to the application). The continuous high pressure treatment at a (single) predefined high pressure level that can be kept/controlled at a constant level within narrow tolerance limits enables an exact prior definition of extraction conditions or of process parameters for the high pressure treatment. This can also improve the quality of the product obtained.

It is optionally possible, in addition to the at least approximately constant high pressure level, to establish a temperature level within the high pressure treatment volume; it is especially possible to maintain a constant temperature. It is optionally possible to run a temperature cycle in the high pressure treatment volume, especially in association with the supply and/or discharge of material.

A fixed arrangement is understood here to mean a static arrangement in which the high pressure treatment volume or the corresponding high pressure treatment cavity bounded by the pressure vessel apparatus (or by the wall thereof) can remain in a fixed arrangement. In other words: the pressure vessel apparatus or the entire arrangement need not assume any function with regard to bulk material displacement by displacement of the high pressure treatment volume. In any case, no displacement of the high pressure treatment volume relative to the further components of the arrangement is required in the case of a fixed arrangement. It is also unnecessary here for the high pressure treatment volume to fulfill any material flow function. In other words: it is not necessary in accordance with the invention for the high pressure treatment volume to be moved (either in absolute or relative terms) in order to ensure the continuity of the method (continuous material flow). Instead, the bulk material can be supplied to the high pressure treatment volume and discharged therefrom again without having to interrupt the high pressure treatment. Within the high pressure treatment volume, it is optionally possible to conduct one or more (continuous or discontinuous) actuating movements, especially for definition of a particular manner of material flow in the continuous high pressure treatment, but the high pressure treatment volume may remain in a fixed arrangement. This facilitates not least the coupling of the high pressure treatment volume to the first and third step sequence, and not least also results in advantages with regard to the pressure-tight configuration of the overall arrangement.

An individual or single high pressure treatment volume is understood here to mean a configuration in which the high pressure treatment need not be conducted in successive individual volumes, but in which the respective batch is disposed just once in a single vessel, in a single cavity or in a single volume and is subjected to high pressure treatment therein. The high pressure treatment volume may bound the entire material flow pathway of the bulk material envisaged for the high pressure treatment. The high pressure treatment volume may accordingly also be described as a high pressure treatment cavity surrounded by the pressure vessel apparatus in a high pressure-tight manner.

In many applications, much more time is required for an extraction phase than for an impregnation phase, especially in the case of a natural product extraction. The high pressure treatment time which is important for the design of the method can be defined primarily by the time required for the extraction. It is optionally possible for the start/end times (in the sense of a dwell time for the bulk material) of the respective phase of the high pressure treatment and the duration thereof to be adjusted individually in each case as a function of bulk material and medium.

It may also be the case here that a procedure with material flow and high pressure medium in countercurrent to one another is advantageous. In the case of an extraction, the high pressure medium may correspond to an extraction medium used. According to the invention, the manner of guiding and onward conduction of bulk material and high pressure medium can be matched in a highly varied manner and very flexibly to the respective application (e.g. pressure level, type of bulk material, type of solvent). It is optionally possible to convey high pressure medium, especially extraction medium, and bulk material in the same direction as well.

It may especially be the case here in extraction of solvent(s), especially also in the case of aerogels as starting material, that inclination of the pressure vessel apparatus or of the high pressure treatment volume to the horizontal is advantageous, especially with regard to outflow or discharge of liquid solvents. For this purpose, an advantageous angle has been found to be in the range from 10 to 30° relative to the horizontal or optionally also relative to the vertical. The inclination may be ascending or descending.

In the first step sequence V1, a high pressure is built up. This can especially be effected by two variants. It is firstly possible to provide a high pressure pump which may optionally also have multiple heads. It is alternatively also possible to use multiple high pressure pumps in parallel. Secondly, the first step sequence V1, in the case that the pressure has already been built up, may essentially be provided solely for the purpose of providing a respective bulk material charge for the pressure vessel apparatus or for the second step sequence V2.

For the third step sequence V3 (depressurization device), it is possible to provide multiple depressurization units or depressurization vessels. This can increase flexibility or variability with regard to discharge of bulk material. The depressurization is preferably effected in a discontinuous manner, especially in multiple stages according to the high pressure level. For this purpose, the respective vessel can be shut off.

In the third step sequence V3, it is optionally also possible to provide a comparatively long depressurization conduit, especially immediately downstream of the second step sequence V2. The depressurization conduit enables an arrangement that is very simple and robust in terms of its construction and can minimize the method- or plant-related complexity for the depressurization V3.

The invention relates to a method and to an apparatus by which the extraction can proceed continuously, especially in such a way that a cycle of loading, pressure buildup, high pressure treatment or extraction, depressurization and unloading that has at least to date been executed in batchwise operation in separate steps can be executed in a continuous manner at least with regard to the high pressure treatment or extraction, such that the manner of high pressure treatment can be decoupled from the preparatory and subsequent process steps. As well as advantages with regard to variability and individualizability and controllability of the high pressure treatment process, this can also achieve a higher production capacity than by means of a conventional arrangement (with comparable plant size). Method-related advantages can be achieved especially because the high pressure treatment need not be effected in a cycle chosen in the first step sequence V1 (pressurization) and/or in the third step sequence V3 (depressurization).

According to the invention, the granular material (bulk material) can be introduced into the high pressure vessel at extraction pressure and discharged again after a defined time without having to change the high pressure treatment level. It is possible here, for example, also to convey extraction medium continuously through the high pressure vessel.

The variants described here for the implementation of material flow are also advantageous especially in the case of major changes in volume. For example, a pressure vessel apparatus with a translational conveying device configured as a push rod with plates mounted pivotably thereon for definition of successive cavities for batches in the high pressure treatment volume can be filled with bulk material to half the maximum fill height in the respective cavity, in relation to a volume of the unexpanded bulk material, such that doubling of the volume of the bulk material is tolerable for the high pressure treatment as the material passes stepwise through the high pressure treatment volume from cavity to cavity.

By contrast, in the case of a discontinuous method regime executed batch/chargewise (batchwise operation), as performed customarily to date, the starting material for the extraction in many cases may be layered only up to a particular height, especially in order to avoid excessive compression. There is a cyclical procedure here of charging a pressure vessel, pressurizing to high pressure and flow of an extraction medium through the vessel for high pressure treatment. Then the pressure vessel is depressurized and emptied again. In a discontinuous batch/chargewise method regime, the pressurization and high pressure treatment are dependent on the material flow. The material can flow only as a function of the pressure conditions. More particularly, depressurization has to be effected to a pressure well below the high pressure level required in order to be able to continue to convey the bulk material. The discontinuous chargewise process regime (batchwise operation) is therefore comparatively complex at least with regard to the fluctuations in pressure required, since at least one depressurization or reduction in pressure from the high pressure level is required in each case for a respective charge.

According to the invention, the pressure buildup, high pressure treatment and depressurization can be spatially separated from one another. In particular, in a first volume, the bulk material can be brought to pressure and conveyed into a second volume (high pressure treatment volume). The pressure in the second volume is the process pressure at all times, and so the high pressure treatment in the second volume can be effected in a continuous manner. The bulk material (granular material) treated, proceeding from the second volume, is conveyed (continuously or in individual batches) into a third volume in which the depressurization can be effected. There follows a detailed description of working examples of the invention.

It has been found that the arrangement of the invention or the procedure of the invention is advantageous especially also for bulk materials configured as aerogels (or aerogel bodies). Especially in the case of aerogels, extraction of solvents may be desirable/required. Especially in the case of aerogels (high-porosity solids), a change in volume, especially increase in volume, in the course of high pressure treatment may be particularly significant, for example by a factor of 10, or, in other words, for example, in the region of a 2-3-fold increase in radius. The variants described here for the implementation of material flow are advantageous especially also in the case of major changes in volume. For example, a pressure vessel apparatus having a conveying device configured as a conveying screw, especially in horizontal alignment, may be filled with bulk material up to half the maximum fill height, in relation to a volume of the unexpanded bulk material, such that doubling of the volume of the bulk material is tolerable for the high pressure treatment.

According to the invention, it is possible to free granular starting material (bulk material configured as granules, aerogel bodies, pellets, powder, beans and/or particles) extractively of a loading in a continuous manner, especially of solvent(s). Supercritical drying can also be effected here, especially by means of $CO_2$. The term "supercritical drying" is understood here to mean drying, especially in the manner of an extraction of solvents and/or water by means of an extraction medium (e.g. $CO_2$), the state of which is above the critical point (or above the critical line or surface).

One of the working examples (especially a first variant) may especially have the following components:

pressurization device with at least one pump set up to pressurize the granular material with high pressure in the first step sequence V1;

pressure vessel apparatus, especially configured as a high pressure extractor, especially as a vertically aligned extractor, for the second step sequence V2;

conveying device, especially conveying screw, especially arranged along the longitudinal axis of the pressure vessel apparatus;

introduction/outlet unit and optionally also introduction/discharge valve, especially each comprising a stub (connection), wherein the outlet unit may be part of an outlet fitting, especially also comprising a downpipe;

depressurization device with at least one depressurization vessel (depressurization unit), for the third step sequence V3.

Illustrative mode of function: granular material or bulk material is fed under high pressure into the pressure vessel apparatus, especially guided to the lower end of a conveying device or guided to the top end of a translationally displaceable and/or pivotable plane, and/or the granular material (especially a batch) is conveyed from one sub-volume to an adjacent subvolume. Optionally, a/the conveying device conveys the bulk material within the high pressure treatment volume by displacement of the bulk material along the material flow pathway within the high pressure treatment volume, especially in the upward direction and further into a downpipe. At the same time, extraction medium, especially $CO_2$, is introduced into the high pressure treatment volume by a stub (connection) and flows through the bed in countercurrent, frees it of solvent and leaves the high pressure treatment volume again through a further stub. Liquid solvent collects at the base of the high pressure treatment volume, where it is discharged through a stub or outlet. After being discharged (continuously or discontinuously) from the high pressure treatment volume, the bulk material is guided into one of several depressurization vessels. These are shut off with a valve, and then the depressurization in the respective depressurization vessel can be effected.

A further working example (especially a second variant) may have, in a modification of or supplementation of the above-described variant, the following components in particular:

horizontally or slightly inclined pressure vessel apparatus with extractor (pressure vessel apparatus set up for extraction);

conveying device, especially conveying screw, especially with its longitudinal axis in the same alignment as the pressure vessel apparatus, especially in horizontal or slightly inclined alignment; or pivotable and/or translationally displaceable planes or plates, arranged individually or in pairs in a multitude of translational longitudinal positions.

The conveying device is especially disposed within a tube made of perforated sheet metal or wire mesh (internal isolation disposed within the high pressure treatment volume), which is permeable to fluids, but acts as isolation for the bulk material.

Further illustrative mode of function: the bulk material, as already described, is brought to pressure and introduced into the high pressure treatment volume at the corresponding stub (inlet fitting). Within a predefinable unit of time, the bulk material is conveyed through the high pressure treatment volume by means of the conveying device, while $CO_2$ is simultaneously guided through the bed, for extraction of the solvent from the bulk material. Liquid solvent may pass here through a liquid-permeable wall (internal isolation, for example with perforated sheet metal) and be collected and discharged at an exit point, especially on an underside of the pressure vessel apparatus. The bulk material may be discharged, for example, in that it falls or is discharged into an exit stub at one end of the tube/extractor. The depressurization can be executed as in the variant described above.

Alternatively, for the depressurization, it is also possible to use a piston motor with a reversed mode of function (in relation to a pump). This piston motor is preferably connected such that mechanical energy is recovered, which is preferably used to build up the pressure in the first step sequence V1. Both processes (compression and depressurization) are then preferably mechanically coupled. As a further embodiment, depressurization can be implemented via the pressure drop in a long depressurization conduit. In other words: the continuity of the high pressure treatment can also be advantageous from an energy point of view, especially in the case of use of a decompression motor. A decompression motor is understood here to mean a unit set up to draw energy from the high pressure medium via mechanical work in the depressurization, especially by means of pistons or turbines driven by the high pressure medium.

For example, a depressurization in the third step sequence V3 can especially be effected in at least two different variants: depressurization in or by means of a pressure-driven piston; depressurization in a predefined depressurization volume (cavity having predefined size/geometry). There may also be a pressure transfer here. In this case, a change in volume can also be effected directly in the (respective) outlet fitting, in the case of a variable transfer cavity (especially provided by a pressure-driven piston). Depressurization energy can be recovered by means of the piston.

Further illustrative mode of function: the bulk material is pressurized by means of at least one pump in the first step sequence V1 and conveyed into the high pressure treatment volume of the pressure vessel apparatus. There is counter-current flow (especially of $CO_2$) through the high pressure treatment volume, in order to achieve extraction. The $CO_2$ (extraction medium) is introduced at one stub and leaves the high pressure treatment volume at a further stub. Liquid solvent is led off at a further stub. The stubs are each equipped with retaining devices for bulk material, for example with sieve plates. At the outlet end of the tube, preparation is made for depressurization by the third step sequence V3, especially by means of a piston motor. The bulk material may be displaced here by means of rotational actuating movements.

Externally operable/openable nonreturn valves may also (have been) provided, especially in order to facilitate controlled conveying of the bulk material.

It is advantageously possible for the pressure vessel apparatus to be subjected to high load in the respective mode of function, especially to an extent of nearly 100% from a spatial point of view with regard to the volume available for high pressure treatment, and especially also to an extent of 100% with regard to time (no time intervals at all without high pressure treatment). Pressurization or depressurization phases are not required. By comparison with a discontinuous process, if anything, only a fraction of the change of load is then required. Economic advantages ultimately also arise, especially due to high throughput of bulk material.

In one embodiment, during the high pressure treatment, individual batches are supplied to the high pressure treatment volume and/or discharged from the high pressure treatment volume. Handling of the material flow in batches may also give advantages with regard to pressure buildup and with regard to depressurization.

In one embodiment, in the continuous high pressure treatment, the rotational actuating movement establishes a constant speed of displacement of the bulk material or cyclical discontinuous batchwise displacement, especially between individual high pressure treatment planes, and this establishes the dwell time or the high pressure treatment time for the bulk material in the high pressure treatment volume. This also gives advantageous distribution, mixing and/or flow around the bulk material or the respective charge. In addition, the volume available for high pressure treatment can be exploited efficiently, especially in that the bed is fitted volumetrically to the available high pressure treatment volume even with regard to increases in volume.

In one embodiment, in the continuous high pressure treatment, the bulk material flow is controlled in that the bulk material, depending on the size and/or cyclical supply of batches/charges, is displaced continuously or in individual discontinuous batches in the high pressure treatment volume by means of the rotational actuating movement. This adjustability can further improve the variability of the overall process.

Cycling may also be envisaged here with alternating direction of an actuating movement, for example for a back-and-forth movement. It is optionally possible here for the inlet and outlet to be provided on the same side of the pressure vessel apparatus. It is optionally possible to reverse the material flow direction within the high pressure treatment volume, especially by switching the direction of rotation of at least one rotational actuator.

In an advantageous arrangement, the pressure vessel apparatus is in an inclined arrangement, especially with an inclination of the longitudinal axis in the range from about 10 to 30 degrees relative to the horizontal plane, where the inclination in material flow direction may be ascending or descending. Especially in the case of an inclined arrangement, the material flow pathway may be laterally bounded by a gas-permeable tube or partition or plate.

In one embodiment, the continuous high pressure treatment comprises fluidizing of the bulk material, especially by means of a fluidized bed (active generation or control of the transition from a solid bed to a fluid bed). The fluidized bed is especially generated exclusively by means of extraction medium. Advantageously, the bulk material is introduced into a fluidized bed in which just one high pressure treatment plane is provided for the fluid bed (especially configured as a displaceable or swivelable valve level or as a rotatable or rotating plate level), especially at a lower end of the pressure vessel apparatus. The fluid bed may be isolated on either side by one of multiple high pressure treatment planes. The corresponding treatment plane may be isolated or closed before withdrawal of the bulk material (bulk material is collected). The fluidized bed may also be formed in multiple treatment planes, especially in multiple planes one on top of another (fluidized bed in a further sense). The fluidized bed enables achievement of advantageous mass transfer properties in combination with unlimited expansion opportunity for the bulk materials being treated. For example, in the case of polystyrene (PS) pellets, controlled surface treatment is also possible. For example, in the case of polystyrene (PS) pellets, controlled surface treatment is also possible.

On completion of high pressure treatment, the gas flow is preferably reduced (reduced throughput), and the bulk material can be collected at the (respective) treatment plane.

The high pressure treatment volume may be provided here as a single volume for the entire high pressure process, i.e. for the entire high pressure treatment stage V2. In other words: it is not necessary to provide a multitude of high pressure stages.

In one working example, the high pressure treatment step sequence V2 is performed exclusively at one (single) high pressure level. This results not least in time advantages. Fluctuations in pressure need not be built up or dissipated. The process becomes slimmer, and not least also becomes less costly and more energy-efficient. Because it is possible to maintain the one (single) high pressure level, the continuous process also becomes more exact since, without the requirement for fluctuations in pressure, it is especially possible to use the dwell time to adjust the effect of the high pressure treatment of the bulk material in a very exact manner, especially depending on a single predefined/pre-definable pressure level.

In one working example, during the high pressure treatment, individual batches of bulk material generated in the first step sequence are supplied to the high pressure treatment volume, wherein the batches form a charge under continuous high pressure treatment. As a result, the individual step sequences can not least also be decoupled from one another in an advantageous manner in terms of process technology. The first step sequence may, for example, be optimized with regard to size of the batch and with regard to pressure levels without having to alter or adjust the second step sequence as a result. The second step sequence, apart from the supply of bulk material, may also remain decoupled from the first step sequence and be individually controlled and optimized with regard to continuous or discontinuous material flow in the high pressure treatment volume. The present invention accordingly also enables a considerable simplification in the optimizing of process parameters of the second step sequence.

The supply of batches may, in one variant, also be effected directly at the target high pressure level. The pressure level in an inlet fitting may optionally also be lower than the high pressure level, especially also in the case of gravitational force-driven supply of bulk material. Preferably, the pressure provided on the outlet side of the first step sequence is at least as high as the high pressure level. This can especially also promote material flow.

In one working example, during the high pressure treatment, individual batches are discharged from the high pressure treatment volume. In this way, it is also possible to optimize the material flow in the high pressure treatment volume. Especially in the case of sensitive bulk material, which must not be significantly mechanically compressed for example, working in batches, especially in individual high pressure treatment planes, may be advantageous.

Advantageous configurations are elucidated hereinafter with regard to matching of all three step sequences V1, V2 and V3 in terms of control technology.

In one working example, in the first step sequence of pressurization, the bulk material flow rate which is adjustable batch/chargewise, especially the size of the respective batch/charge and/or a time cycle of the batch/charge, is controlled as a function of the bulk material throughput (absolute material flow) envisaged in the high pressure treatment step sequence or of the high pressure level. By matching in terms of process technology in the first step sequence via an adjustment of batch/charge sizes or cycling operations to the demands or process parameters of the second step sequence, the adjustment of process parameters in the second step sequence can remain as flexible as possible. According to the invention, therefore, there is great potential for optimization and a great variety of variants for the second step sequence, which broadens the spectrum of use of the high pressure treatment.

In one working example, in the third step sequence of depressurization, the chargewise bulk material flow rate, especially the size of the respective batch/charge and/or a time cycle of the batches/charges, is controlled as a function of the bulk material flow or of the high pressure level in the high pressure treatment step sequence. This too enables optimization of the second step sequence with regard to material flow, and optimization with maximum focus with regard to the high pressure treatment as such.

In one working example, a/the respective bulk material batch provided by the first step sequence of pressurization is smaller in terms of volume or in terms of mass than the charge under continuous high pressure treatment, i.e. smaller than the amount of bulk material treated or displaced in the high pressure treatment, especially smaller by a factor of 3 to 1000. This also results in great flexibility in terms of process technology. The factor may, for example, also be 10 or 100, according to the application, and according to the type of bulk material.

In one working example, in the continuous high pressure treatment, by controlling a rate of displacement of the bulk material which is constant in particular (preferably constant movement, continuous material flow) or by controlling cycling of discontinuous displacement of high pressure-treated batches between individual high pressure treatment planes, the dwell time or high pressure treatment time for the bulk material is established in the high pressure treatment volume. This can establish or optimize the desired effects of the high pressure treatment in a comparatively exact manner in spite of continuity of the process.

In one working example, in the continuous high pressure treatment, the bulk material flow is controlled by displacing the bulk material, depending on the size and/or cycling over time of batches supplied, continuously or in individual discontinuous batches in the high pressure treatment volume. This provides flexibility and a variety of variants with regard to material flow during high pressure treatment as well, such that a broad spectrum of use can be developed for various bulk materials.

The invention is also based on the concept of spatial separation or separability of the individual step sequences from one another. The decoupling of the material flow in the first and third step sequences, each from the material flow in the second step sequence, can optionally result in spatial decoupling. This has not only spatial advantages but also gives high degrees of freedom in the design of the process, especially in the choice of the most advantageous plant components for the high pressure treatment.

Advantageous configurations with regard to the step sequence of high pressure treatment V2 are elucidated hereinafter.

In one working example, the bulk material for the high pressure treatment V2 is disposed in at least one predefined first high pressure treatment plane and, proceeding from this first high pressure treatment plane, is displaced continuously or between further high pressure treatment planes (i.e. from high pressure treatment plane to high pressure treatment plane) within the high pressure treatment volume during the high pressure treatment V2 by virtue of the rotational or translational actuating movement and/or in reaction to the rotational or translational actuating movement. In this way, it is especially also possible to treat sensitive bulk material in an efficient manner. Arrangement in individual planes can also give advantages with regard to maximum homogeneity of flow of high pressure medium through the material.

In one working example, the continuous high pressure treatment comprises continuous displacement of the bulk material in a predefined material flow direction in the high pressure treatment volume, especially in a horizontal or vertical direction or in a direction inclined obliquely upward. In this way, it is also possible to match material flow direction and flow direction of high pressure medium.

In one working example, by continuous displacement of the bulk material (bulk material constantly in motion) or by discontinuous displacement between individual high pressure treatment planes in the high pressure treatment, a dwell time of the bulk material in the high pressure treatment volume is established, especially by adjustment of a speed of rotation of rotational actuators and/or by cycling of rotational or translational actuators or else optionally also in a gravitational force-driven manner or optionally additionally also by adjustment of the speed or by cycling of translational actuators that are optionally provided additionally. In this way, it is possible to influence the effects of the high pressure treatment in an exact manner, especially in a locally independent manner and independently of the first and third step sequences in terms of process technology.

In one working example, the continuous high pressure treatment comprises continuous displacement of the bulk material in two different predefined material flow directions in the high pressure treatment volume Vi, especially in two opposite material flow directions, namely in a first material flow direction defined by the rotational or translational actuating movement and in a second gravitational force-driven material flow direction. This can also achieve advantageous configurations for the displacement of the bulk material in the high pressure treatment volume. In addition, the material can optionally be introduced and discharged at the same end of the pressure vessel apparatus, for example at the base.

In one working example, the continuous high pressure treatment comprises continuous displacement of the bulk material counter to gravity (or gravitational force) by supply of potential energy to the bulk material by means of the rotational or translational actuating movement. In this way, it is especially also possible to optimize the discharge of bulk material from the high pressure treatment volume.

Elucidated hereinafter are advantageous configurations with regard to the manner of displacement of bulk material in the step sequence of high pressure treatment V2.

In one working example, the continuous high pressure treatment comprises continuous displacement of the bulk material or discontinuous displacement between individual high pressure treatment planes, in each case by means of a rotation or translation, especially by means of a rotation or translation of at least one rotational or translational actuator about an axis of rotation aligned in material flow direction.

In one working example, the continuous high pressure treatment comprises batchwise displacement of the bulk material by a rotation or translation, especially by cyclical rotation or translation of at least one rotational or translational actuator. In each case, this can achieve displacement of the bulk material in a technically simple and exact manner. The rotational actuating movement can be coupled into the high pressure treatment volume in an advantageous manner.

The continuous high pressure treatment may optionally also comprise continuous displacement of the bulk material or discontinuous displacement between individual high pressure treatment planes, in each case by translation of at least one optionally additionally provided translational actuator, supplementing at least one rotational actuating movement. This can especially also achieve decoupling of the material flow from gravity.

In one working example, the continuous high pressure treatment comprises, at least in sections, an autonomously gravitational force-driven continuous displacement of the bulk material. This especially also gives a slim construction in terms of apparatus technology, wherein the material flow can be effected in an autonomous manner at least in sections, for example in conjunction with a downpipe.

In one working example, the continuous high pressure treatment comprises fluidizing of the bulk material, especially in at least one fluidized bed, especially in an outlet region of the pressure vessel apparatus. This can especially also ensure efficient mass transfer, i.e. an efficient high pressure treatment. The at least one fluidized bed is especially produced exclusively by means of extraction medium.

If the high pressure treatment volume is defined by a single coherent compartment or has just one high pressure treatment plane, the fluidized bed can be generated throughout the compartment (fluidized bed in the conventional, narrower sense). If the high pressure treatment volume is defined by a multitude of compartments and/or has a multitude of high pressure treatment planes, the fluidized bed may also be established by turbulent flow characteristics and associated turbulent fluidization in the respective compartment or in the respective high pressure treatment plane (fluidized bed in the wider sense, in the form of a multitude of turbulent fluidized regions).

In one working example, the continuous high pressure treatment comprises continuous displacement of the bulk material by a continuous rotational actuating movement or by multiple discontinuous translational actuating movements, especially with the rotational actuator configured as a conveying screw or coupled to a conveying screw, or especially with the translational actuator configured as a push rod with at least one gas-permeable plate mounted swivelably thereon. This also provides an apparatus construction for a broad spectrum of application. The axis of actuation of the rotational actuator may define the axis of rotation of a conveying screw.

In one working example, the continuous high pressure treatment comprises discontinuous gravitational force-driven displacement of the bulk material by means of multiple discontinuous rotational actuating movements, especially with the rotational actuator configured as a shaft with at least one gas-permeable plate which is connected thereto in a rotationally fixed manner and has at least one passage segment. This also enables controlled influence on the arrangement of the bulk material or of the respective batches within the high pressure treatment volume. The rotational actuating movement may also be defined via the respective high pressure treatment plane (opposed kinematics; vice versa).

In one working example, the continuous high pressure treatment comprises discontinuous displacement of the bulk material in individually displaced/displaceable batches, each between predefined high pressure treatment planes, especially between high pressure treatment planes each defined by at least one gas-permeable plate or gas-permeable partition which is horizontal or inclined relative to the horizontal (especially rotationally actuatable in each case). In this way, it is especially also possible to optimize the material flow and mass transfer, especially also in the case of bulk material or granules that may be compressed only to a minimum degree or may be subjected to only a minor degree of mechanical or abrasive stress.

A plate may be understood to mean any type of element which is permeable or impermeable to fluids, which enables at least partial removal in the high pressure treatment volume and is set up for definition of one of the high pressure treatment planes (at least in sections). The plate may be in a fixed or displaceable arrangement. The plate may especially also be set up for arrangement of a batch of the bulk material. The plate may optionally be in an inclined alignment and/or optionally in a swivelable arrangement, and optionally also in a rotatably or additionally also translationally displaceable arrangement, or vice versa.

There follows an elucidation of advantageous configurations of the step sequence of pressurization V1.

In one working example, the first step sequence of pressurization is performed in a discontinuous manner and comprises at least one step from the following group: batchwise pressure generation, especially by means of a pump, and/or batchwise supply of bulk material to the step sequence of high pressure treatment by means of an inlet fitting that accommodates the respective batch. The inlet fitting may, for example, comprise a ram, a seated plug valve (valve in the narrower sense), a ballcock valve and/or a flap. The principle of use of a ram is disclosed, for example, in published specification DE 42 16 295 A1.

In one working example, the step sequence of pressurization comprises batchwise supply of bulk material, wherein the batchwise supply is performed by means of an inlet fitting having at least one inlet unit, especially valve and/or lock (airlock, rotary feeder). In this way, it is possible in each case to decouple the material flow from high pressure treatment parameters in the second step sequence as well.

The batchwise supply of bulk material for pressurization and/or batchwise discharge of bulk material on completion of high pressure treatment here may also be performed at multiple gradated pressure levels, especially at a pressure level between ambient pressure and high pressure level, especially at at least 2 or 3 bar, especially at more than 6 or more than 10 bar. According to the application, the ambient pressure may also be elevated in relation to atmospheric pressure, especially in the range from 3 to 10 bar.

The conveying of bulk material discharged from the high pressure treatment volume may also be based on a pressure differential (suction conveying). A reduced pressure is not required. A reduced pressure may optionally be generated in the third step sequence for conveying of the bulk material downstream of the high pressure treatment step.

The devices in the step sequence of pressurization and in the step sequence of depressurization are set up, each individually or in their entirety, to ensure a pressure differential of at least 40 bar (especially from ambient pressure or atmospheric pressure to the high pressure level).

Elucidated hereinafter are advantageous configurations of the step sequence of depressurization V3.

In one working example, the third step sequence of depressurization is performed in a discontinuous manner and comprises at least one step from the following group: batchwise depressurization, especially by means of a piston motor, and/or batchwise discharge of bulk material from the step sequence of high pressure treatment by means of an outlet fitting that accommodates the respective batch. The outlet fitting may comprise, for example, a ram, a ballcock valve, a seated plug valve (valve in the narrower sense) and/or a flap.

In one working example, the step sequence of depressurization comprises batchwise discharge of bulk material, wherein the batchwise discharge is performed by means of an outlet fitting with at least one outlet unit, especially valve and/or lock (airlock, rotary feeder). In this way, it is possible in each case to decouple material flow as well from high pressure treatment parameters in the second step sequence.

In one working example, in the batchwise supply and/or discharge of bulk material in at least one of the step sequences of pressurization and depressurization, the amount of bulk material is detected, especially in a gravimetric manner, especially in relation to individual bulk material batches. This enables not just monitoring of the material flow but also facilitates open-loop or closed-loop control, especially with regard to batches (especially times, volumes).

In one working example, in the batchwise supply and/or discharge of bulk material in at least one of the step sequences of pressurization and depressurization, actuation of inlet and/or outlet fittings is effected especially as a function of gravimetric measurements of bulk material batches that are detected in real time. This promotes further optimization measures, especially with regard to material flow.

Elucidated hereinafter are advantageous configurations of the step sequence of high pressure treatment V2.

In one working example, the continuous high pressure treatment comprises at least one continuous extraction, especially extraction of solvents. This also enables process parameters optimized specifically for the process of extraction. This also gives synergies in terms of process technology, especially also with regard to the recovery or reuse of solvents.

In one working example, the continuous high pressure treatment comprises at least one continuous impregnation, especially the impregnation of polymers. This also enables process parameters optimized specifically for the process of impregnation. In this way, it is also possible to achieve synergistic effects in terms of process technology. The impregnation can also be conducted in combination with at least one extraction.

In one working example, the continuous high pressure treatment comprises both a continuous extraction and a continuous impregnation, especially extraction of monomers and impregnation with additives. This also broadens the spectrum of use of the invention.

In one working example, the high pressure treatment comprises at least one continuous extraction of solvent(s) and is performed above the critical temperature and above the critical pressure of the extraction medium (i.e. supercritically). This especially also gives a high method efficiency, especially since this can minimize surface forces, and the extraction becomes particularly effective, also with regard to a drying effect. It is thus also possible to achieve a particularly high continuous throughput. Starting materials subjected to an extraction may be either liquids (fluids in the liquid phase, especially also viscous fluids) or solids. Examples of bulk materials subjected to high pressure treatment include:

granular material (especially polymer granules), aerogel bodies, pellets, powder, beans, particles and/or other free-flowing aggregates of a multitude of bodies.

In one working example, the continuous high pressure treatment comprises flow of high pressure medium through the bulk material, especially in countercurrent to a continuous or discontinuous displacement (or displacement direction/material flow direction) of the bulk material. In this way, it is also possible to achieve advantages with regard to mass transfer and homogeneity of the high pressure treatment.

In one working example, the continuous high pressure treatment is performed at constant high pressure or with fluctuations in pressure that are unavoidable for technical reasons (which are perceptible to a greater or lesser degree according to the application), especially at a high pressure in the range from 500 to 1000 bar. Such fluctuations in pressure that are systemic, for example, on account of control valves, pulsations, lock operations or temperature fluctuations, are, for example, in the range from 3 to 5 bar or within the maximum percentage range of the high pressure level that can be established. This continuously constant pressure level also enables high efficiency in terms of process technology. Active pressure control is optionally possible in the direction of the target high pressure level over and above a variation in pressure of 1 bar or 2 bar, especially if the fluctuations in pressure that are unavoidable for technical reasons are comparatively high. Within the scope of these variations for technical reasons, the high pressure level may be considered/defined as being constant according to the above definition.

In one working example, the pressure vessel apparatus comprises a pneumatic, hydraulic, electrical, electromagnetic and/or magnetic drive unit which is especially coupled to at least one rotationally actuatable treatment plane by means of an actuator. This simplifies the automation, and the type of drive can be chosen especially depending on the bulk material to be treated.

In the configurations of a translational actuation described hereinafter, particularly the advantages outlined above in connection with rotational actuation are apparent.

In one working example, the at least one translational actuator takes the form of a pull and/or push rod (uni- or bidirectionally actuating), which extends in radial direction. This also gives advantages with regard to individualizable control of an individual high pressure treatment plane among a multitude.

In one working example, the translational actuator has a conveying effect on the bulk material in respect of material flow at least approximately in the direction of gravity. This also has advantages not least with regard to gravity-driven discharge of bulk material.

In one working example, in the continuous high pressure treatment, the translational actuating movement establishes a displacement speed or cyclical discontinuous batchwise displacement, especially between individual high pressure treatment planes or between individual subvolumes, where this establishes the dwell time or the high pressure treatment time for the bulk material in the high pressure treatment volume.

In one working example, the bulk material is conveyed through the high pressure treatment volume in batches in a discontinuous manner during the high pressure treatment in that the translational actuator is moved back and forth between a first stroke position and a second stroke position while actuating at least one kinematic mechanism for allowing the passage of or blocking of material flow.

In one working example, the bulk material is conveyed through the high pressure treatment volume in batches in a discontinuous manner during the high pressure treatment in that the translational actuator is moved at least two translationally displaceable planes back and forth between a first stroke position and a second stroke position.

In one working example, the bulk material during the high pressure treatment is conveyed through the high pressure treatment volume in batches in a discontinuous manner in that the translational actuator is moved back and forth between a first stroke position and a second stroke position, wherein each stroke position is defined by a high pressure treatment plane in a fixed arrangement.

In one working example, the bulk material is conveyed through the high pressure treatment volume in batches in a discontinuous manner during the high pressure treatment in that the translational actuator is moved back and forth between a first stroke position and a second stroke position, wherein the first stroke movement from the first to the second stroke position is a blocking stroke movement with a displaced kinematic swivel mechanism in a blocking arrangement and a kinematic swivel mechanism in a fixed arrangement for passage, and wherein the second stroke movement from the second to the first stroke position is a stroke movement for passage with a displaced kinematic swivel mechanism in a passage arrangement and a kinematic swivel mechanism in a blocking fixed arrangement.

In one working example, the bulk material for the high pressure treatment is disposed in at least one predefined first high pressure treatment plane and, proceeding from this first high pressure treatment plane, is moved by the respective translational actuating movement between further high pressure treatment planes in the high pressure treatment volume during the high pressure treatment.

In one working example, discontinuous batchwise displacement between individual high pressure treatment planes in the high pressure treatment by the respective translational actuating movement establishes a dwell time of the bulk material in the high pressure treatment volume, especially by cycling of the respective translational actuator, especially by cycling of multiple translational actuators with respect to one another as a function of time.

In one working example, the continuous high pressure treatment comprises discontinuous batchwise gravitational force-driven displacement of the bulk material, especially at least approximately in the direction of gravity.

In one working example, the continuous high pressure treatment comprises discontinuous batchwise displacement of the bulk material by a multitude of individual translational actuating movements, especially back-and-forth movements, especially with at least one translational actuator configured as a push rod with at least one kinematic swivel mechanism mounted in an axially fixed manner thereon.

In one working example, the continuous high pressure treatment comprises discontinuous batchwise gravitational force-driven displacement of the bulk material by multiple discontinuous translational actuating movements, especially with at least one translational actuator configured as a push/pull rod with at least one unidirectionally blocking kinematic swivel mechanism comprising at least one gas-permeable plate.

The aforementioned object is also achieved in accordance with the invention by a control device set up to execute an above-described method, wherein the control device is coupled to at least one sensor unit set up to detect a flow of bulk material or a mass or a difference in mass or a volume, which sensor unit can be arranged in the material flow pathway in the high pressure treatment volume, wherein the control device optionally also comprises at least one sensor unit set up to detect a distance and/or a force and/or a pressure, wherein the control device is set up to evaluate and control a rotational actuating movement or a translational actuating movement, in each case for definition of the bulk material flow through a/the high pressure treatment volume. This gives rise to advantages mentioned above.

The control device or the sensor unit may be coupled to an actuator of the pressure vessel apparatus. The respective sensor unit may especially also be coupled to or integrated into an inlet or outlet fitting.

The aforementioned object is also achieved in accordance with the invention by a high pressure treatment arrangement set up for high pressure treatment of bulk material by extraction and/or impregnation at a high pressure level, especially high pressure in the range from 40 to 1000 bar, comprising:

a pressurization device with pressure generation means, especially at least one pump, for a pressurization V1 as the first step sequence;

a pressure vessel apparatus coupled to the pressurization device by a high pressure-tight connection and having a high pressure-resistant wall that surrounds a high pressure treatment volume for the high pressure treatment V2 as the second step sequence;

a depressurization device coupled to the pressure vessel apparatus by a high pressure-tight connection for a depressurization V3 as the third step sequence;

wherein the pressure vessel apparatus for the high pressure treatment can be/is in a fixed arrangement and is set up for a continuous high pressure treatment solely by means of the one (single) high pressure treatment volume which is in a fixed arrangement and is at the high pressure level, and wherein the pressure vessel apparatus has a rotational actuator (an actuator displaceable by rotation) or translationally displaceable actuator and is set up for a rotational actuating movement or for at least one translational actuating movement, each for displacement of the bulk material through the high pressure treatment volume during the high pressure treatment, especially from an inlet fitting up to an outlet fitting or up to a unit coupled to the outlet fitting. This results in advantages mentioned above. After the first step sequence V1, preferably at least the high pressure level is applied. An extraction circuit may be operated, for example, by means of a high pressure pump set up for provision of a pressure level at least at the high pressure level, especially likewise independently of the material flow in the high pressure treatment volume.

In one working example, the high pressure treatment arrangement is set up to supply individual bulk material batches to the high pressure treatment volume during the high pressure treatment and also set up to continuously or discontinuously displace the bulk material in the form of a single charge or in batches within the high pressure treatment volume during the high pressure treatment. This gives not least also high variability, according to the application.

In one working example, the high pressure treatment arrangement is set up to discharge individual batches from the high pressure treatment volume during the high pressure treatment. In this way, it is also possible to adjust or control the material flow in a flexible manner. In the high pressure treatment volume, it is possible here for at least one predefined first high pressure treatment plane or optionally also further high pressure treatment planes to be provided, each set up for arrangement of the bulk material (or one charge or multiple batches) in predefined length or height positions. The discharge can optionally be effected at a central outlet, but optionally also at multiple non-central outlets, especially also specifically according to the high pressure treatment plane.

In other words: the pressure vessel apparatus is set up especially for the continuous high pressure treatment at the high pressure level in that the high pressure treatment arrangement has an inlet fitting coupled to the high pressure treatment volume in a high pressure-tight connection and an outlet fitting, each for the bulk material, which can be actuated discontinuously for provision of individual bulk material charges and each of which can be controlled individually at least with regard to the bulk material flow, in such a way that the high pressure treatment can be performed in a continuous manner at the high pressure level in the high pressure treatment volume Vi.

In one working example, the rotational actuator takes the form of a conveying screw, especially with its longitudinal axis aligned with or parallel to the longitudinal axis of the high pressure treatment volume. This not least gives a very robust construction.

In one working example, the rotational actuator takes the form of a conveying screw which extends around a downpipe for discharge of the bulk material. This not least also has advantages with regard to gravity-driven discharge of bulk material.

In one working example, the rotational actuator takes the form of a conveying screw disposed in a fluid-permeable, especially gas-permeable and bulk material-isolating tube (internal isolation). This not least promotes the removal of extracted media from the bed.

In one working example, the rotational actuator takes the form of a conveying screw in an eccentric arrangement in the high pressure treatment volume, where one or more actuators may optionally also be provided. This not least also enables variations with regard to dwell time. In particular, it is also possible to subject comparatively sensitive bulk materials to parallel simultaneous high pressure treatment in smaller batches.

In one working example, the rotational actuator is set up to actuate at least one plate having at least one passage segment for arrangement or for passage of bulk material, in each case in a high pressure treatment plane defined by the plate. This also promotes batchwise displacement of the bulk material.

In one working example, the pressure vessel apparatus has at least one high pressure treatment plane which is in a fixed arrangement or can be arranged in a movable or displaceable manner within the high pressure treatment volume Vi and can be loaded with bulk material with the pressure vessel apparatus closed, and which can be unloaded in the course of high pressure treatment or after the high pressure treatment with the pressure vessel apparatus closed, in such a way that the high pressure treatment can be performed in a continuous manner. For this purpose, the respective high pressure treatment plane may, for example, be in an inclined alignment. It is optionally possible for the respective high pressure treatment plane to be aligned and movable at least approximately orthogonally to the direction of gravity and/or to be adjustable in terms of its cross-sectional profile. In this way, it is possible to control material flow.

In one working example, the inlet fitting for the batchwise supply of the bulk material to the second step sequence V2 (high pressure treatment) can be actuated in an automated manner, wherein a transfer cavity can be provided especially by means of a piston or a (rotary) feeder. The same applies to the outlet fitting and the batchwise discharge of the bulk material from the step sequence of high pressure treatment. This in each case also simplifies control of the material flow, especially in each case also based on measurement data from gravimetric and/or volumetric sensors, and/or based on cycling over time.

In one working example, the pressure vessel apparatus defines an at least approximately vertically aligned material flow direction through the high pressure treatment volume, especially by the rotational actuating movement. This also enables advantages by exploitation of gravity; the discharge of the bulk material can also be simplified thereby.

In one working example, the pressure vessel apparatus defines a material flow direction inclined relative to the vertical or horizontal, especially at an angle of 10 to 30°, especially by the rotational actuating movement. This can also achieve advantages with regard to mass transfer and/or with regard to mixing of the bed. It is possible here to define the material flow direction by means of the actuating movement.

In one working example, the pressure vessel apparatus defines an at least approximately horizontally aligned material flow direction, especially by the rotational actuating movement. This also gives advantages with regard to outflow of extracted media, especially with regard to collection and discharge of liquid solvent. Even in the case of horizontal arrangement, it is possible to adjust and control material flow largely independently of gravitational forces, such that it is also possible to ensure comparatively high variability with regard to the selection of bulk material (mass, density, surface characteristics). For example, the use of nonreturn valves may also be advantageous, especially as barriers between individual compartments of the high pressure treatment volume.

In one working example, at least one of the high pressure treatment planes is defined by at least one gas-permeable plate which is horizontal (or orthogonal to the direction of gravity) or inclined relative to the horizontal, or by a gas-permeable partition in a corresponding arrangement. The inclined arrangement also enables autonomous gravitational force-driven bulk material displacement within the high pressure treatment volume. In the case of an inclined arrangement of the plate, the plate preferably extends only over about ¾ of the diameter of the pressure vessel apparatus. In the case of an inclined arrangement of multiple plates, the plates may be in an offset cascade-like arrangement relative to one another. This configuration is also advantageous with regard to changes in volume in the bulk material.

A horizontal arrangement may also be understood to mean an arrangement at least approximately orthogonal to the longitudinal extent of the pressure vessel apparatus.

In one working example, in the high pressure treatment volume, multiple high pressure treatment planes are defined by gas-permeable plates arranged in pairs, one of which in each case is connected to the rotational actuator in a rotationally fixed manner. This also enables a simple robust construction in which the material flow between individual planes can be defined in a simple manner.

In one working example, in the high pressure treatment volume, multiple high pressure treatment planes are defined by gas-permeable plates arranged in pairs, which are each connected to the respective translational actuator in an axially fixed manner via a kinematic swivel mechanism, especially with a single-sidedly blocking kinematic swivel mechanism.

In one working example, in the high pressure treatment volume, multiple high pressure treatment planes are each defined by at least one gas-permeable plate with outflow chamfers and with at least one passage segment, especially in a mutually flush arrangement centrally in the high pressure treatment volume. This not least also facilitates an arrangement that is gentle on the granular material in advantageous layer thicknesses of the bed.

In one working example, the rotationally or translationally displaceable actuator is set up for individual actuation of one high pressure treatment plane in each case of the pressure vessel apparatus and/or for simultaneous synchronous actuation of all high pressure treatment planes of the pressure vessel apparatus. This also gives high variability. The actuator may, for example, be connected in a rotationally fixed manner to a plate in a respective high pressure treatment plane. A snap-fit mechanism may optionally also be provided.

In one working example, the pressure vessel apparatus has at least one rotationally displaceable actuator set up to actuate at least one high pressure treatment plane of the pressure vessel apparatus, and especially optionally additionally also has a translationally displaceable actuator, especially at least one actuator coupled into the high pressure treatment volume in a high pressure-tight manner with respect to the environment. In this way, it is especially also possible to individually displace batches within the high pressure treatment volume.

The respective actuator may be guided into the pressure vessel apparatus at at least one feedthrough, for example by means of a gland or a magnetic coupling. It is optionally possible, for actuation of the respective actuator, also to provide a motor (fluid motor, electric motor), optionally also within the pressure vessel apparatus.

In one working example, the inlet fitting comprises at least one inlet unit, especially a valve and/or a (rotary) feeder. The inlet fitting may optionally also have multiple or different inlet units, especially with a size-variable transfer cavity.

In one working example, the translational actuator is movable back and forth between a first stroke position and a second stroke position, wherein the first stroke position and the second stroke position are each defined by a high pressure treatment plane.

In one working example, the translational actuator is kinematically coupled to a kinematic swivel mechanism that can have a blocking and passage arrangement. This not least promotes the displacement of batches by means of a robust kinematic mechanism of simple construction.

In one working example, the pressure vessel apparatus has at least one kinematic swivel mechanism which is disposed in a fixed arrangement within the high pressure treatment volume and can have a blocking and passage arrangement.

In one working example, the pressure vessel apparatus has at least one first and at least one second kinematic swivel mechanism, each of which are blocking and for passage in the same swivel direction.

In one working example, the pressure vessel apparatus has at least one displaceable first kinematic swivel mechanism coupled to the translational actuator and has at least one second kinematic swivel mechanism in a fixed arrangement in the high pressure treatment volume. This promotes stroke-by-stroke conveying of batches through the high pressure treatment volume in predefined length sections. The local arrangement of the bed can thus be predefined in a comparatively exact manner. This may also be advantageous, for example, with regard to impregnation or series connection of multiple high pressure treatment steps.

In one working example, a/the first and second kinematic swivel mechanism of the pressure vessel apparatus are in autonomously swiveling form without a swivel drive, i.e. swivel solely in reaction to translational movement or in reaction to a force exerted by bulk material.

In one working example, a respective high pressure treatment plane is defined by at least one gas-permeable plate.

In one working example, the pressure vessel apparatus has at least one drive unit and a multitude of actuators in the form of push/pull rods set up for bidirectional translational actuation of the respective high pressure treatment plane, especially with the actuators in linear arrangement alongside one another in a transverse plane.

In one working example, the respective high pressure treatment plane or a plate of the high pressure treatment plane is coupled via at least one actuating lever and two pivot joints to an actuatable actuator which is routed into the high pressure treatment volume in a high pressure-tight manner. This kinematic mechanism especially also enables bidirectionally controllable swivel movement.

In one working example, the pressure vessel apparatus comprises a pneumatic, hydraulic, electrical, electromagnetic and/or magnetic drive unit coupled to the at least one plane or high pressure treatment plane. With regard to the type of drive, the optimization can be made to the respective application.

In one working example, the translational actuator takes the form of a push rod, especially with its longitudinal axis aligned with or parallel to the longitudinal axis of the high pressure treatment volume. This also promotes a simple construction.

In one working example, the translational actuator takes the form of a push rod with a multitude of kinematic swivel mechanisms connected thereto in an axially fixed manner.

This can simplify the overall kinematic mechanism, especially by virtue of a central actuating movement.

The configurations described above with regard to translation may, according to the application, be used as an alternative to or for supplementation of the rotational configurations.

The aforementioned object is also achieved in accordance with the invention by use of a pressure vessel apparatus for continuous high pressure treatment of bulk material by extraction and/or impregnation in a closed system isolated from the environment U in a high pressure-tight manner, wherein the high pressure treatment V2 is performed and individually controlled as a step sequence between a pressurization V1 and a depressurization V3, wherein the bulk material is displaced continuously in a high pressure treatment volume in a fixed arrangement in the pressure vessel apparatus or is displaced at predefinable/predefined times in batches, especially between individual high pressure treatment planes, in that the bulk material is conveyed (displaced) through the high pressure treatment volume by means of at least one rotational actuating movement or as a function of at least one translational actuating movement, especially use of the pressure vessel apparatus in an above-described method, especially use of the pressure vessel apparatus in an above-described high pressure treatment arrangement, especially under high pressure at pressures above 40 to 1000 bar. This gives rise to numerous aforementioned advantages.

The aforementioned object is also achieved in accordance with the invention by use of a pressure vessel apparatus for continuous high pressure treatment of bulk material configured as polymers, by extraction and optionally also by impregnation, for supercritical drying for provision of the polymers as superinsulators, wherein the high pressure treatment V2 is performed as a step sequence between a pressurization V1 and a depressurization V3, wherein the bulk material is treated at the high pressure level in a continuous manner in a high pressure treatment volume in a fixed arrangement, in that the bulk material is conveyed through the high pressure treatment volume by means of at least one rotational actuating movement or as a function of at least one translational actuating movement, especially use of the pressure vessel apparatus in an above-described method, especially use of the pressure vessel apparatus in an above-described high pressure treatment arrangement, especially under high pressure at pressures above 40 to 1000 bar. This gives rise to numerous aforementioned advantages.

The aforementioned object is also achieved in accordance with the invention by use of a pressure vessel apparatus for continuous high pressure treatment of bulk material configured as aerogels, by extraction and/or by impregnation in a closed system isolated from the environment in a high pressure-tight manner, wherein the continuous high pressure treatment V2 is performed as a step sequence between a pressurization V1 and a depressurization V3, wherein the bulk material is treated at the high pressure level in a continuous manner in a high pressure treatment volume Vi in a fixed arrangement, wherein the bulk material is continuously displaced in the pressure vessel apparatus or is displaced at predefinable/predefined times in batches, especially between individual high pressure treatment planes, in that the bulk material is conveyed through the high pressure treatment volume by means of at least one rotational actuating movement or by means of at least one translational actuating movement, especially use of the pressure vessel apparatus in an above-described method, especially use of the pressure vessel apparatus in an above-described high pressure treatment arrangement, especially under high pressures at pressures above 40 to 1000 bar. This results in numerous aforementioned advantages. In particular, material flow can also be optimized with regard to large changes/increases in volume in the region of a factor of 10.

Figure 1B:
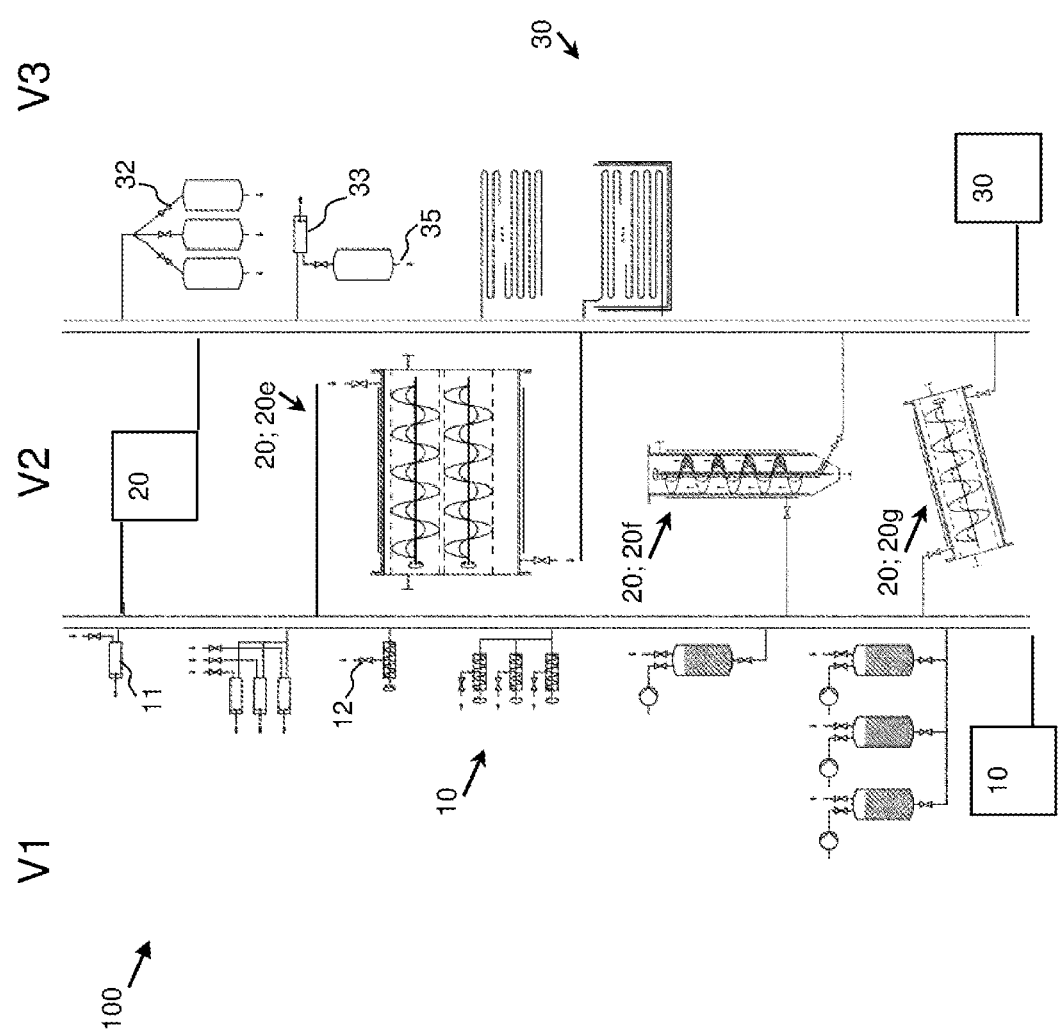
FIG. 1B is a schematic view or an at least partial cross-sectional side view of an overview of individual variants of a first, second, and third step sequence and the apparatuses provided for the purpose according to a second working example.

FIGS. 1A, 1B show individual variants of an inventive high pressure treatment arrangement 100. For a first step sequence V1, individual variants of a pressurization device 10, 10a, 10b, 10c, 10d, 10e, 10f are shown. The pressure generation means 11 used may especially be a pump or a piston. An inlet fitting 12 may have one or more inlet units, especially a valve and/or a (rotary) feeder. A rotary feeder especially also gives the advantage that onward passage of gas is made more difficult.

Additionally shown, for a second step sequence V2, are individual variants of a pressure vessel apparatus 20, 20a, 20b, 20c, 20d, 20e, 20f, 20g (reference to rotational actuating movement) of the high pressure treatment arrangement 100.

Additionally shown, for a third step sequence V3, are individual variants of a depressurization device 30, 30a, 30b, 30c, 30d of the high pressure treatment arrangement 100. It is possible here for multiple depressurization units 31 to be provided, which can each be coupled to a second step sequence V2 via one central or multiple non-central inlet fittings 32. A piston or piston motor 33 may be connected via at least one depressurization unit 31 to an outlet fitting 35 for final discharge of the bulk material.

A control device 101 indicated by way of example for variant 20b is connected to or comprises a logic unit 103. The control device 101 may, for example, also be coupled to sensor units and/or to actuators. The control device may also comprise the logic unit and be set up to control the method steps described in detail here.

The arrangement in columns for the individual apparatuses 10, 20, 30 of the respective step sequence V1, V2, V3 illustrates that the respective variants can be combined with one another. The individual variants for the second step sequence V2 are shown in detail in FIGS. 2 to 5C.

The pressure vessel apparatus 20a shown in FIG. 1A illustrates the use of a rotational actuator in horizontal alignment; this variant is also described in detail in FIG. 4.

Figure 2:
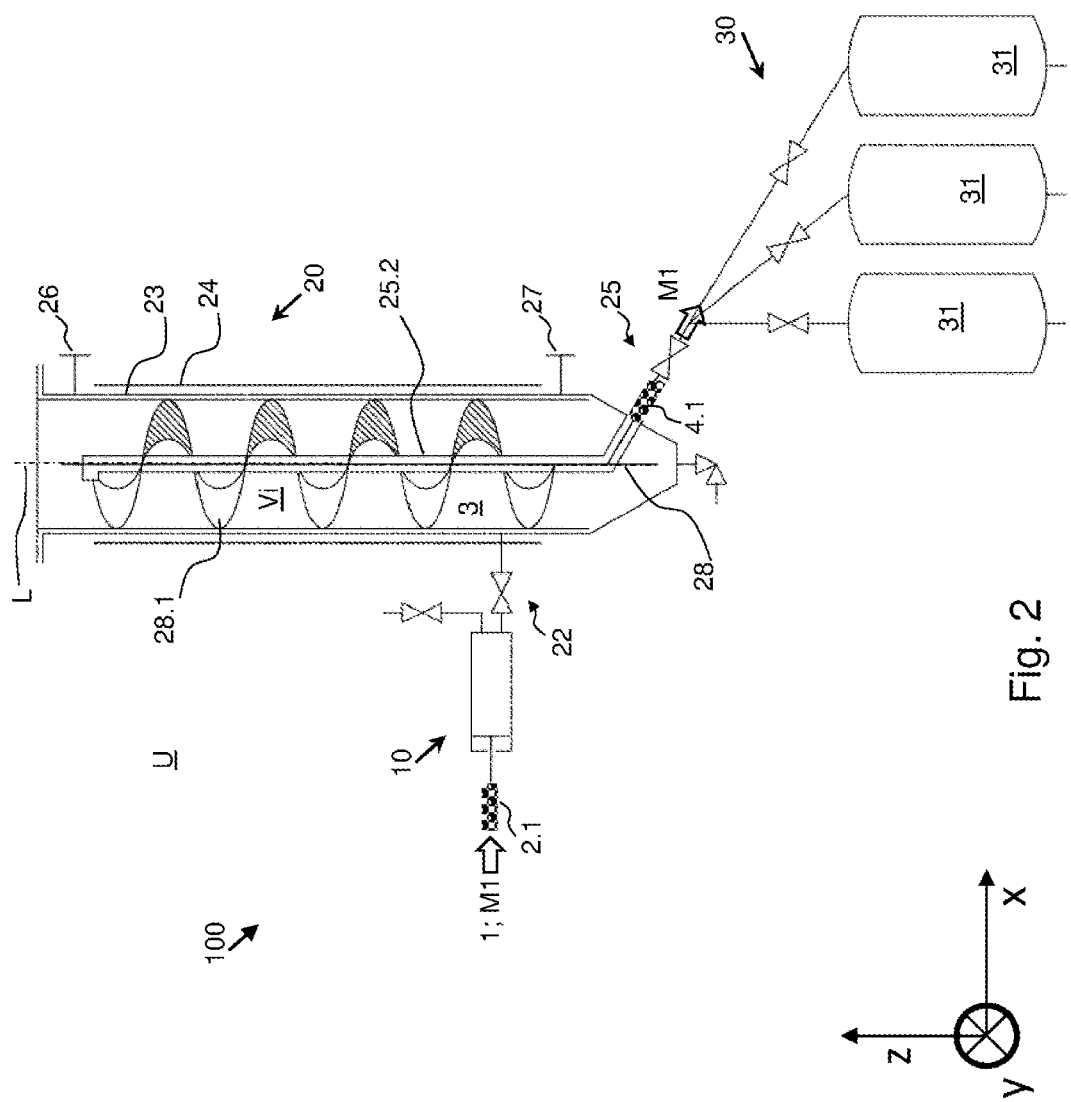
FIG. 2 is a schematic cross-sectional side view of an example high pressure treatment arrangement.

The pressure vessel apparatus 20b shown in FIG. 1A illustrates the use of a rotational actuator in vertical alignment; this variant is also described in detail in FIG. 2.

The pressure vessel apparatus 20c shown in FIG. 1A illustrates the use of a rotational actuator in vertical alignment, wherein the actuator is coupled to a multitude of planes or plates; this variant is also described in detail in FIG. 5.

The pressure vessel apparatus 20d shown in FIG. 1A (as opposed to the pressure vessel apparatus according to variant 20c) features an annular gap for supply or discharge of extraction medium or of extracted solvent; a further annular gap may be provided on the inside of the central tube (double tube; tube-in-tube) in the high pressure treatment volume, with at least one outlet being provided per high pressure treatment plane, especially in that the extraction medium can flow through the bed radially (inward or outward) in the respective high pressure treatment plane. The configuration of the pressure vessel apparatus 20d can be described as a "crossflow" configuration; inner tube and outer double wall are in a fluid-permeable execution, such that the fluids used flow through the respective bed in radial direction. The individual high pressure treatment planes are preferably executed not in a fluid-permeable manner, but in a fluid-impermeable manner.

The pressure vessel apparatus 20e shown in FIG. 1B illustrates the use of a rotational actuator in vertical alignment, wherein the actuator is coupled to a multitude of planes or plates, wherein each plane is arranged at a radial distance from the inner wall of the pressure vessel arrangement via an internal isolation, so as to create an annular gap lying radially outward from the charge. The kinematic rotation mechanism may be in a fixed installation together with the planes or may be retrofittable individually for each plane.

The pressure vessel apparatus 20f shown in FIG. 1B shows a use of a rotational conveying device supported on the lid of the pressure vessel apparatus. This variant enables, for example, adjustment of the conveying device to the type of bulk material being treated.

The pressure vessel apparatus 20g shown in FIG. 1B illustrates the use of a rotational actuator inclined relative to the horizontal and vertical; variants of this working example are also described in detail in FIG. 3.

The continuity of the high pressure treatment in variants 20a, 20b, 20e, 20f, 20g according to FIGS. 1A, 1B, 2, 3A, 3B, 3C, 4A, 4B, 4C, 5A, 5B, 5C can be ensured especially due to the high pressure treatment volume Vi that is kept at a high pressure level, especially in combination with an individual, especially homogeneous, rotational actuating movement (optionally constant speed of rotation) for displacement of the charge counter to gravity and to the gravity-driven discharge from the high pressure vessel, or for displacement of the charges in at least approximately horizontal direction. In the case of horizontal arrangement of the vessel, the charge can also be kept/displaced in an optimized manner with regard to pressure/pressurization and opportunities to expand. Even in the case of batchwise supply of material, the bed can form as a single coherent charge due to the conveying screw. The charge can optionally also be displaced in an inclined direction relative to the horizontal plane. In the case of such an arrangement of the vessel or axis of the conveying unit, the charge can also be handled in an optimized manner with regard to removal of solvent(s).

The continuity of the high pressure treatment in variants 20c, 20d according to FIG. 1A can especially be ensured due to the high pressure treatment volume Vi that is kept at a high pressure level, especially in combination with rotational actuating movements for gravitational force-driven batchwise displacement of batches by one plane downward in each case, each in reaction to a single rotational actuating movement or in reaction to actuating movements actuated individually for each plane.

For the purpose of better clarity, a general description is given in advance of the pressure vessel apparatus 20 implementable in the second step sequence V2 in each case. The respective pressure vessel apparatus 20 especially has components from the following group: internal isolation 21, inlet fitting 22, high pressure-resistant wall 23, heating device, especially heating shell 24, outlet fitting 25, in-/outflow fitting 26, in-/outflow fitting 27, rotational actuator 28.

FIG. 2 shows a variant of the high pressure treatment arrangement 100 in which a rotational actuator 28 (especially rod/shaft) is coupled in a rotationally fixed manner to a conveying device 28.1 configured as a conveying screw, and the conveying screw is coupled to a downpipe 25.2 of an outlet fitting 25. Another advantage that arises in this variant is that the bulk material can be displaced counter to gravity under comparatively good control, especially in the case of comparatively high dwell times, and can additionally loosen up prior to discharge, i.e. is not in the form of a tamped dense bed. This not least also promotes operationally reliable material flow with minimized risk with regard to material backup or disadvantageously high mechanical pressure on the bed. The entire conveying device can be inserted into the high pressure treatment volume and be screwed, for example, to the lid of the high pressure vessel and/or at least laterally supported on the inner wall 23. On the inside of the inflow and outflow fittings 26, 27, sievelike inserts may be provided, especially for retention of bulk material. The fitting 26 may optionally also be disposed in the lid of the pressure vessel apparatus.

By means of the actuating movement, which is preferably continuous in this working example, and which is about a single longitudinal axis or actuation axis L, it is possible to ensure a material flow of a single charge through the entire high pressure treatment volume. The charge is composed of individual batches supplied to the high pressure treatment volume, but is treated and displaced as a single charge within the high pressure treatment volume.

In the high pressure treatment volume Vi isolated from the environment U, the high pressure treatment of tea leaves, coffee beans or hops, for example, is effected. Extraction medium can circulate via the in-/outflow fittings 26, 27.

FIGS. 3A, 3B, 3C show, in detail, a variant of the high pressure treatment arrangement 100 with an inclined arrangement of the pressure vessel apparatus 20. In the case of particular bulk materials, the inclined arrangement can give advantages with regard to material flow and also with regard to the density of the bed (porosity); in addition, the contacting of the bed with extraction medium and the discharge/exit of extract or solvent can be promoted. The inclined arrangement gives advantages especially also in the case of extraction of solvent with regard to collection of the solvent, in order to be able to discharge the solvent in the liquid state at a central outlet.

FIG. 3A also shows an internal isolation, especially a cylindrical partition (fluid-permeable inner wall) 21 that surrounds the rotational actuator 28 and isolates the bulk material from an annular cavity. Fluids can be supplied or removed in an advantageous manner in the annular cavity between the isolation 21 and the wall 23.

As in the working example described in FIG. 2, the actuating movement is made about a single actuation axis L for the entire high pressure treatment volume Vi along the entire material flow pathway, in a continuous and/or cyclical manner.

By means of an arrangement according to FIG. 3B, it is especially also possible to optimize the energy efficiency. The two piston units 33 shown may especially be aligned in a coaxial arrangement to one another with the longitudinal axes, such that, in the case of operation of one piston unit, energy recovery and energy utilization is achievable for the other piston unit.

FIGS. 4A, 4B, 4C show, in detail, individual variants of the high pressure treatment arrangement 100 with at least approximately horizontal arrangement of the pressure vessel apparatus 20, with optional provision of multiple rotational actuators 28, especially in at least approximately parallel alignment to one another, especially each coupled to a conveying device 28.1 configured as a conveying screw. FIG. 4C shows a variant with three actuators 28.

The three variants shown in FIG. 4A differ in that the high pressure treatment volume Vi can optionally be confined by an isolation 21. In other words: the cavity defined and bounded by the apparatus as high pressure treatment volume Vi is bounded by the isolation 21 (which may especially be permeable to fluids, for example on account of holes or perforation or a wire mesh), and the isolation is bounded on the outside by the high pressure-resistant wall 23, such that an annular cavity V21 which is kept clear of bulk material is defined further on the outside of the high pressure treatment volume. The isolation 21 is not necessarily high pressure-resistant; in particular, the isolation is gas-permeable and is an isolation which is effective solely with regard to the bulk material.

In the working example according to FIG. 4A, the rotational actuating movement is preferably configured as an actuating movement that displaces the entire charge, especially as a continuous actuating movement defined uniformly for the entire high pressure treatment volume.

In the working example according to FIGS. 4B, 4C, three rotational actuating movements each about an individual actuation axis L are provided, each of which displaces a charge (independently of the other charges) along the entire material flow pathway in the high pressure treatment volume, such that, in spite of a multitude of charges subjected to high pressure treatment, there are no batches. Multiple charges 3 are disposed in the high pressure treatment volume Vi, and these are displaced individually by means of individual actuating movements along the respective material flow pathway (here in accordance with the respective actuation axis L). In this high pressure treatment arrangement, the high pressure treatment volume is divided into multiple subvolumes by fluid-permeable inner walls 21, in each of which the high pressure treatment can be performed simultaneously. The respective rotational actuating movement may be a continuous and/or an at least intermittently cyclical actuating movement. The respective rotational actuating movement is defined uniformly over the entire respective material flow pathway. This working example especially also gives advantages with regard to maximum homogeneity of flow or charging of the bed with solvent.

Figure 5B:
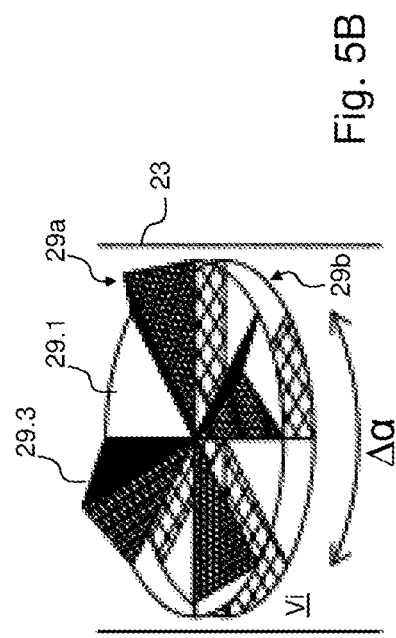
FIG. 5B is a schematic perspective detail view of the pressure vessel apparatus of FIG. 5A.
Figure 5C:
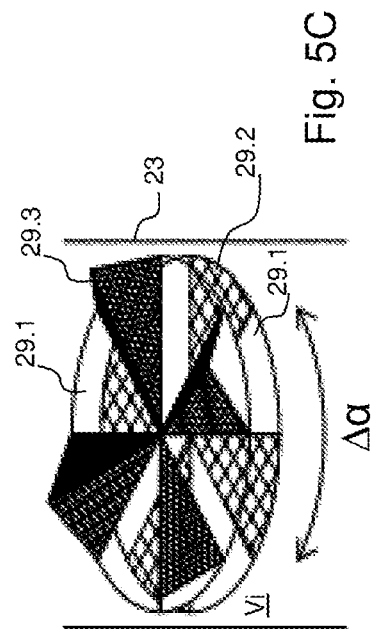
FIG. 5C is a another schematic perspective detail view of the pressure vessel apparatus of FIG. 5A.
Figure 5A:
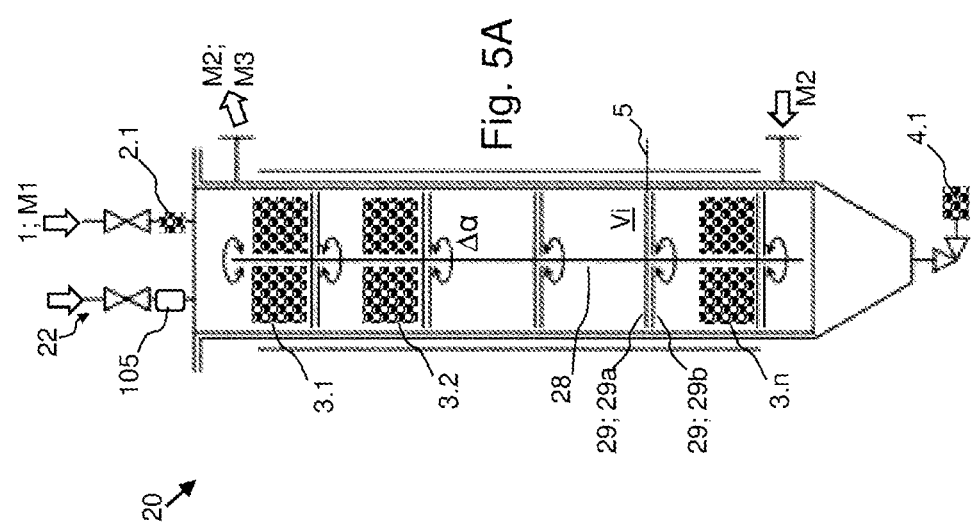
FIG. 5A is a schematic cross-sectional side view of a further working example of a pressure vessel apparatus of a high pressure treatment arrangement.

FIGS. 5A, 5B, 5C show, in detail, a variant of the high pressure treatment arrangement 100 in which a rotational actuator 28 (especially rod/shaft) is coupled to a multitude of treatment planes 5, wherein each treatment plane 5 is defined by a pair of plates 29; 29a, 29b, one of which is in a fixed and static arrangement and the other is rotationally displaceable and connected to the actuator 28 in a rotationally fixed manner. A respective batch 3.1, 3.2, 3.n may be displaced between the individual treatment planes 5, especially in a gravitational force-driven manner in reaction to relative twisting of the two plates 29a, 29b of a respective treatment plane 5 relative to one another.

The rotational actuating movement may be at least approximately a continuous movement, or the rotational actuating movement may optionally also be discontinuous between at least two actuation positions (especially open position and closed position).

More particularly, FIG. 5A shows, in detail, the use and arrangement of individual treatment planes 5 in the fixed volume Vi, wherein at least one rotational actuator 28 is provided. FIG. 5A shows three different media streams: first media stream M1: bulk material; second media stream M2: high pressure medium or extraction medium, optionally comprising impregnation medium; third media stream M3: extract (especially discharged solvent stream). The first media stream M1 here may also comprise a feed of solvent present in/on the bulk material, but this does not correspond to any explicitly envisaged stream of matter or material flow pathway, but depends on the substances or constituents with which the bulk material is laden/contaminated. The media streams M2, M3 may be mono- or biphasic.

The example of FIG. 5A can also be used to elucidate the material flow: bulk material 1 is supplied as a single batch 2.1. In the high pressure treatment volume, multiple bulk material batches 3.1, 3.2, 3.n form the bulk material charge 3 under high pressure treatment. The bulk material flow is propagated, for example, by multiple discharged batches 4.1. It is possible here to provide at least one sensor unit 105, especially for temperature, pressure, force, distance, mass and/or flow rate. The respective sensor unit 105 is especially also disposed in at least one of the treatment planes 5.

FIGS. 5B, 5C illustrate the manner in which the respective treatment plane 5 can be established in an isolating state or in a passage state.

FIG. 5B illustrates a passage state in which a respective passage segment 29.1 of the upper plate 29a connected to the actuator in a rotationally fixed manner is arranged in a rotation position flush with a respective passage segment 29.1 of the lower plate 29b in a fixed arrangement. In addition, a respective inclined, especially conical (or gable roof-shaped) segment 29.3 of the upper plate 29a is disposed flush with a respective flat segment 29.2 of the lower plate 29b. The respective paired plate arrangement 29a, 29b allows passage. The inclined surfaces may fulfill a function as outflow chamfers for the bulk material and also reduce any risk with regard to unwanted local bulk material deposition.

FIG. 5C illustrates an isolating state in which, in reaction to a rotational actuating movement Δα (change in angle of rotation), a respectively inclined, especially conical segment 29.3 of the upper plate 29a is in a flush arrangement with respect to a respective passage segment 29.1 of the lower plate 29b. The respective paired plate arrangement 29a, 29b blocks the flow.

The individual plates 29 are especially each configured as a circular disk with the cutouts (passage openings) already described.

It is optionally possible for the planes to be actuated individually and separately or simultaneously and together of the rotational actuating movement. The passage openings 29.1 may be in a flush or offset arrangement.

The plate pair 29 shown in FIG. 5B may, in other working examples, also be configured as a pair of two flat plates each with at least one passage 29.1 for bulk material. The plates are each in a fluid-permeable configuration.

The respective actuating movement in the working example shown in FIGS. 5A, 5B, 5C can ensure a material flow of a multitude of batches 3.1, 3.n through a section along the material flow pathway through the high pressure treatment volume Vi. The rotational actuating movement may be a continuous and/or an at least intermittently cyclical actuating movement. The (respective) rotational actuating movement may be defined uniformly for the entire high pressure treatment volume for all high pressure treatment planes, and/or be defined at least intermittently and specifically in each case for individual predefinable high pressure treatment planes 5.

FIG. 6 describes an illustrative process sequence.

A first step sequence V1 (pressurization) especially comprises three different steps:

S1.1 feeding of bulk material as a batch/charge to a pressurization volume

S1.2 building up the pressure in the pressurization volume, and maintaining the pressure S1.3 conveying the bulk material into the high pressure treatment volume A second step sequence V2 (continuous high pressure treatment) especially comprises the following steps:

S2.1 displacing the bulk material in the high pressure treatment volume

S2.2 high pressure treatment by extraction

S2.3 high pressure treatment by impregnation

S2.4 discharging bulk material from the high pressure treatment volume

The displacement S2.1 may optionally comprise one of the following steps:

S2.1a batchwise conveying of the bulk material in the high pressure volume

S2.1b continuous conveying of the bulk material in the high pressure volume

S2.1c disposing batches of the bulk material on one plane each

The displacement S2.1 comprises at least one rotational actuating movement, especially by means of at least one actuator configured as a rod or shaft (rotary driving means), especially by means of plates coupled thereto in a rotationally fixed manner. More particularly, the displacement may be configured individually with regard to the following aspects: a single actuation axis or multiple actuation axes; actuating movement for material flow of one or more charges through the entire high pressure treatment volume or actuating movement for material flow of a multitude of batches through a section along the material flow pathway through the high pressure treatment volume; continuous and/or at least intermittently cyclical actuating movement; uniform actuating movement for the entire high pressure treatment volume and/or actuating movement defined at least intermittently and specifically in each case for individual predefinable high pressure treatment planes.

A third step sequence V3 (depressurization) especially comprises the following steps:

S3.1 feeding of bulk material as a batch/charge into a depressurization volume

S3.2 reducing the pressure in the depressurization volume

S3.3 discharging bulk material from the depressurization volume

Figure 7A:
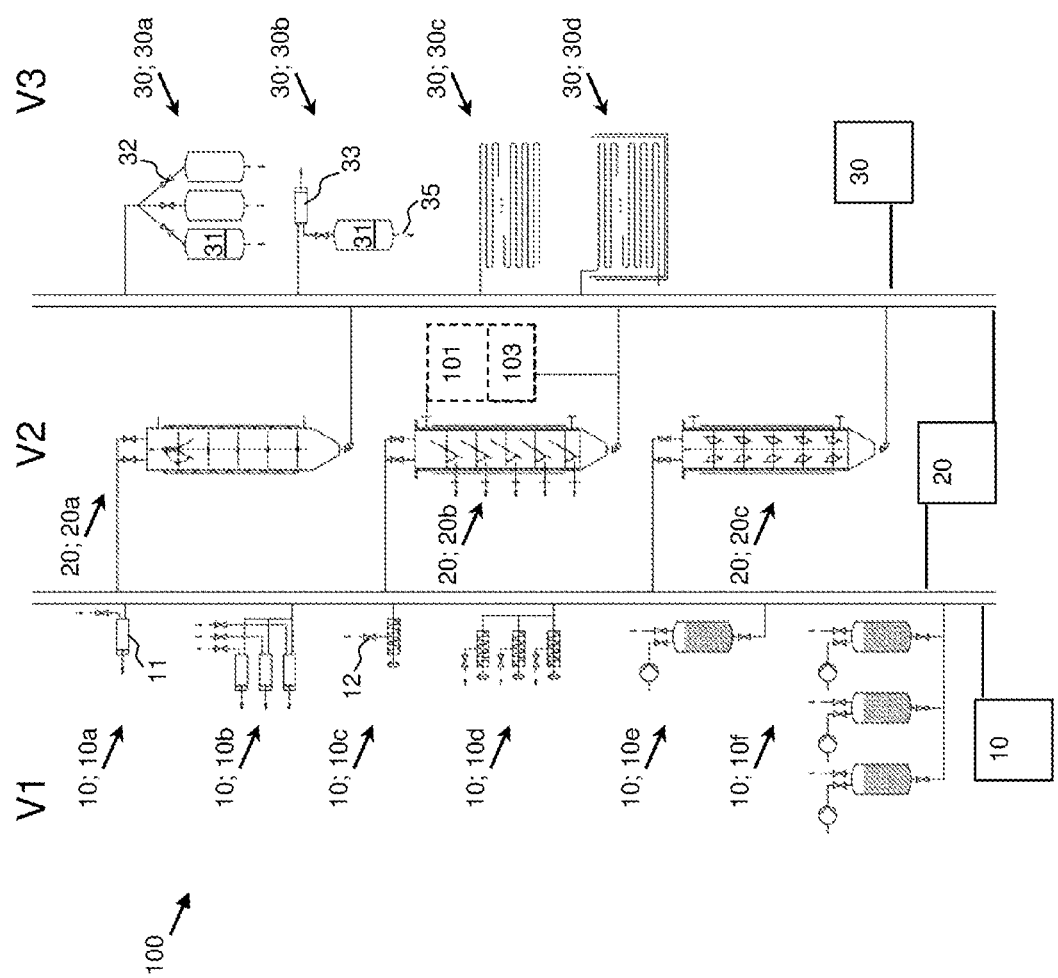
FIG. 7A is a schematic diagram of an overview of individual variants of a first, second, and third step sequence and apparatuses provided for the purpose according to each working example.

FIG. 7A shows individual variants of an inventive high pressure treatment arrangement 100. For a first step sequence V1, individual variants of a pressurization device 10, 10a, 10b, 10c, 10d, 10e, 10f are shown. The pressurization means 11 used may be especially a pump or a piston. An inlet fitting 12 may have one or more inlet units, especially a valve and/or a (rotary) feeder. A rotary feeder especially also gives the advantage that onward passage of gas is made more difficult.

Also shown for a third step sequence V3 are individual variants of a depressurization device 30, 30a, 30b, 30c, 30d of the high pressure treatment arrangement 100. It is possible here for multiple depressurization units 31 to be provided, which can be coupled to a respective second step sequence V2 via one central or multiple non-central inlet fittings 32. A piston or piston motor 33 may be connected via at least one depressurization unit 31 to an outlet fitting 35 for final discharge of the bulk material.

With references to translational actuating movements, the individual variants of the pressure vessel apparatus are identified by the reference numerals 20a, 20b, 20c, 20d, 20e, 20f, 20g, 20h, 20j, 20k, 20l, 20m, 20n. With regard to the above-described rotational actuating movements, the reference numerals 20a, 20b, 20c, 20d, 20e, 20f, 20g have likewise been assigned, but refer to independently achievable configurations and as such serve merely as numbering.

A control device 101 indicated by way of example for variant 20b is connected to or comprises a logic unit 103. The control device 101 may, for example, also be coupled to one or more sensor units and/or to one or more actuators. The control device may also comprise the logic unit and may be set up to control the method steps described in detail here.

The arrangement in columns for the individual apparatuses 10, 20, 30 of the respective step sequence V1, V2, V3 illustrates that the respective variants can be combined with one another. The individual variants for the second step sequence V2 are shown in detail in FIGS. 7B, 7C, 7D, 7E, 7F, 7G, 7H, 7J, 7K, 7L, 7M, 7N, 7O.

Figure 7O:
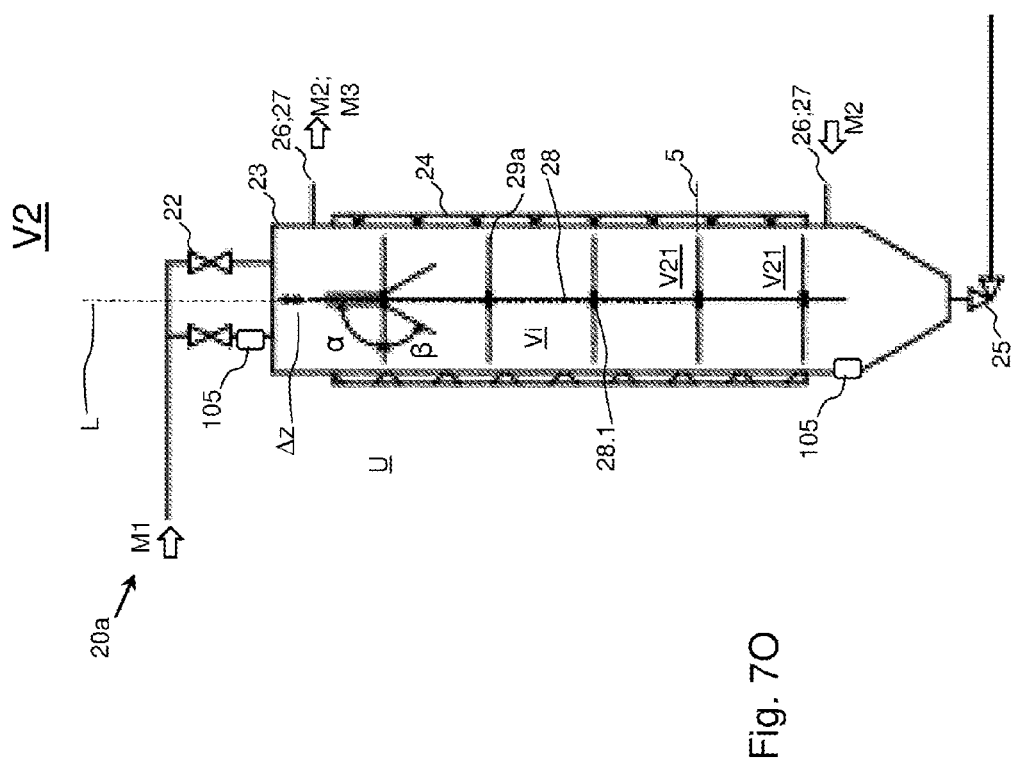

For the purpose of better clarity, a general description is given in advance of the pressure vessel apparatus 20 implementable in the second step sequence V2 in each case, with particular reference to FIG. 7O. The respective pressure vessel apparatus 20 especially has components from the following group: inlet fitting 22, high pressure-resistant wall 23, heating device, especially heating shell 24, outlet fitting 25, in-/outflow fitting 26, in-/outflow fitting 27, translational actuator 28.

FIG. 7B shows two working examples in which individual treatment planes can be actuated laterally. In the wall of the pressure vessel apparatus 20b are provided feedthroughs for lateral actuating means (especially actuator 28), in each case specifically for each treatment plane. The actuatable lateral actuating means enable a kinematic mechanism at least comprising a swivel mechanism, especially actuated by means of push rods. The actuating means may be coupled directly to the respective plate or indirectly to the respective treatment plane by means of a kinematic coupling. FIG. 7B shows the principle of lateral actuation in the case of central or eccentric mounting of plates, optionally with provision of one or more plates swivelable downward on one side or upward and downward on both sides for each treatment plane. Additionally or alternatively to the inlet for bulk material at the lid end, it is also possible to provide an inlet fitting and/or outlet fitting laterally in each case at the level of the respective treatment plane. The translational actuating movement may, for example, be in any plane in radial direction (bidirectional; back and forth).

FIG. 7C shows three working examples of a pressure vessel apparatus 20c, in each of which a kinematic mechanism that has a flap construction and opens from the inside outward is provided, wherein outflow chamfers and/or edge regions for support constructions may optionally also be provided in the respective treatment plane. For each treatment plane, at least two plates in a symmetric arrangement with regard to the longitudinal middle axis and transverse bar are provided, each swivelable in the downward and upward direction. The respective plate is mounted eccentrically about a swivel axis, and opening is effected from the middle outward (swiveling in the downward or else upward direction). The kinematic mechanism may especially also comprise coupling joints and/or pulling means and/or at least one spring mechanism with resetting movement. The translational actuating movement is in axial direction.

FIG. 7D shows two working examples of a pressure vessel apparatus 20d in which multiple treatment planes are provided, each of which is formed by an integral plate. The kinematic mechanism for displacement of the plates is especially formed by a respective pull/push rod 28 (actuator) (especially eccentric arrangement of the push rod (lever linkage), with just one inlet fitting in a central arrangement). These working examples give advantages especially with regard to robustness and simple construction. The plates swivel downward on one side, and optionally also upward. The respective batch/charge can be supplied centrally via the lid. The discharge can be effected centrally via an outlet fitting at the bottom end. Central discharge at the base gives, for example, process-related advantages, especially in the case of gravitational force-driven discharge, especially with regard to complete discharge without residues. The translational actuating movement is in axial direction.

FIG. 7E shows a working example of a pressure vessel apparatus 20e in which a kinematic swivel mechanism is disposed in a pressure vessel apparatus with lateral inlet fittings. Bulk material can be discharged centrally at the outlet fitting at the bottom end. In this working example, the kinematic mechanism can be optimized for downward swiveling and discharge. The translational actuating movement (actuator 28) is in axial direction.

FIG. 7F, 7G each show a working example of a pressure vessel apparatus 20f, 20g with a comparatively narrow, elongated high pressure treatment volume Vi, especially provided by a pipelike high pressure vessel wall. The pistons inserted into the ends of the high pressure treatment volume serve for pressure buildup and for pressure release, and can also be provided in combination with single-sidedly blocking internals of the nonreturn valve type or in combination with unidirectionally blocking flaps. The respective optimal configuration of the flaps or shutoff units may depend on the application or the type of bulk material; for example, it is also possible to provide semicircular foldable halves of plates. FIG. 7F describes a construction with a single cavity for the high pressure treatment volume (no subdivision, no isolation). FIG. 7G describes a multistage construction with multiple mutually delimited cavities within the high pressure treatment volume, the cavities being isolated from one another by the isolation units 29.

In the working example of a pressure vessel apparatus 20h shown in FIG. 7H, pressurization and depressurization units are external, i.e. not coupled to the high pressure treatment volume or to the pressure vessel but provided upstream and downstream thereof.

The continuity of the high pressure treatment according to FIGS. 7F, 7G, 7H may in each case especially be ensured by virtue of the high pressure treatment volume Vi kept at a high pressure level, especially in combination with the pressure-driven batchwise supply and discharge of batches of the bed.

FIG. 7J shows a working example of a pressure vessel apparatus 20j with plates 29 or flaps 29a in a paired arrangement. Both the plates 29 and the flaps 29a are blocking on one side (blocking with respect to bulk material; but gas- or fluid-permeable); the plates 29 are in a fixed arrangement, and the flaps 29a are co-rotating, i.e. coupled to the translational actuator 28a, especially mounted thereon by a swivel joint. In principle, the working example shown in FIG. 7J can be described as a concept of a reciprocating piston pump or a beam pump. Joints or bearings for the fixed plates 29 may especially be secured on the vessel wall, or on middle bars connected to the vessel wall in a fixed arrangement; it is also possible for counter bearings or stops for the co-rotating flaps 29a to be secured thereon. Both the plates 29 and the flaps 29a open in conveying direction (to the right in FIG. 7J). The continuity of the high pressure treatment may especially be ensured due to the high pressure treatment volume Vi kept at a high pressure level, especially in combination with successively repeated translational actuating movements back and forth between a translational zero position and a translational end position, wherein the translational movement in one direction (to the right in FIG. 7J) is a stroke movement for conveying of the material (actively initiated/actuated material flow by unidirectional translational actuating movement), and wherein the bed is displaced stepwise in batches on the individual planes or in the individual compartments defined by the plates in the high pressure treatment volume Vi. The kinematic mechanism used (28, 28b, 29, 29a) for the single-sidedly blocking mechanism can be described as a translational kinematic swivel mechanism.

FIG. 7K shows a top view of a working example of a pressure vessel apparatus 20k, which enables material flow by means of local geometric variations of compartments or sections within the high pressure treatment volume Vi. Two pistons 29b are secured to the translational actuator 28b and hence displaced within the high pressure treatment volume Vi (in horizontal direction according to FIG. 7K). The pistons 29b act bidirectionally: in a first direction, the respective piston on the inlet side generates a negative pressure differential (negligible or at least not to be regarded as a pressure cycle compared to the high pressure level), such that bulk material is conveyed into the high pressure treatment volume Vi (flap or nonreturn valve 29 opens on the inlet side into the high pressure treatment volume Vi), and in a second opposite actuation direction the respective piston generates a positive pressure on the inlet side, such that bulk material is discharged from the high pressure treatment volume Vi (flap or nonreturn valve 29 closes on the inlet side to the high pressure treatment volume Vi). On the outlet side of the high pressure treatment volume Vi, the same movement of the piston 29a leads to an opposite effect. The piston here also isolates two compartments of the high pressure treatment volume Vi that are respectively connected to one another via a conduit section from one another. The flaps 29 in the arrangement in FIG. 7K are displaced in lateral direction (upward or downward according to FIG. 7K). The arrangement according to FIG. 7K can be constructed in a multistage series construction. The continuity of the high pressure treatment can especially be ensured due to the high pressure treatment volume Vi kept at a high pressure level, especially in combination with successively repeated translational actuating movements back and forth between two translational end positions, wherein the translational movement is a bidirectional stroke movement for conveying of the material (bidirectionally translationally actuated material flow), and wherein the bed is displaced in batches in the individual sections or compartments within the high pressure treatment volume Vi.

FIG. 7L shows a working example of a pressure vessel apparatus 201 in which the material can flow independently of gravitational forces throughout the high pressure treatment volume Vi independently of flaps or valves, especially by means of a conveying device routed horizontally through the high pressure treatment volume Vi, especially a conveyor belt, which defines a high pressure treatment plane for arrangement of the bulk material. The continuity of the high pressure treatment can especially be ensured due to the high pressure treatment volume Vi kept at a high pressure level, especially in combination with a rotational actuating movement (rotary drive for conveyor belt), which is converted by means of the kinematic mechanism of the conveying device to a translational material flow movement of the entire bed. In this variant too, the material flow in the high pressure treatment volume Vi can be controlled independently of the feed or discharge of batches.

In the above-described working examples, temperature regulation for compliance with/control of a constant temperature level can optionally be effected. The internals within the high pressure treatment volume that are shown in FIGS. 7B to 7E and 7L to 7O may either be fixedly installed and constructed or be configured as at least one insert, especially for mounting on a lid of the pressure vessel apparatus. The execution variants shown in FIGS. 7F to 7K may optionally consist of multiple assemblies that have been connected by high pressure-tight flange connections, for example, and are mounted in succession.

FIG. 7M shows two working examples of a pressure vessel apparatus 20m in which the translational kinematic mechanism has a lever linkage in a central arrangement, by means of which the individual plates (planes) are swivelable by translation. For each treatment plane, for example, two plates may be provided, especially in a symmetric arrangement. The swiveling is effected either without an actuation lever or by means of a kinematic mechanism in each case comprising one actuation lever per half of the plate. The plates are shown in FIG. 7M, in each case in redundant form, in the individual displacement/swivel positions.

In FIG. 7N shows two working examples of a pressure vessel apparatus 20n, which are characterized by an eccentric arrangement of the respective actuator 28. For each treatment plane, one eccentrically and swivelably mounted plate is provided (pivot axis in an eccentric arrangement), and is swivelable in the upward and downward direction. Edge regions of a respective treatment plane may be utilized for support constructions. The translational actuating movement here is in axial direction.

FIG. 7O shows three different media streams: first media stream M1: bulk material; second media stream M2: high pressure medium or extraction medium, optionally comprising impregnation medium; third media stream M3: extract (especially discharged solvent stream). The first media stream M1 may also comprise a feed of solvent present in/on the bulk material, but this does not correspond to an explicitly provided stream of matter or material flow pathway, but rather is dependent on the substances or constituents with which the bulk material is loaded/contaminated. The media streams M2, M3 may be mono- or biphasic. The third media stream M3 may also generally be regarded as (extracted) loading of the bulk material.

FIG. 7O additionally also illustrates a first swivel angle α, especially upward counter to the direction of gravity, and a second swivel angle β, especially downward in the direction of gravity.

In the working examples shown above, the respective treatment plane may be formed in each case by a first portion and a second portion (especially by two halves), each of which is mounted swivelably and in a fixed or translationally displaceable arrangement.

In the high pressure treatment volume Vi isolated from the environment U, the high pressure treatment of tea leaves, coffee beans or hops, for example, is effected. Extraction medium can circulate through the in-/outflow fittings 26, 27.

Further elucidated in FIGS. 8A, 8B, 8C, 8D, 8E, 8F is a cyclical translational actuating movement for assurance of material flow for continuous high pressure treatment.

FIG. 8A shows a process state in which a translational actuator 28 is arranged in a neutral zero position, especially in the middle between a first stroke position and a second stroke position.

FIG. 8B shows a process state in which the translational actuator 28 is arranged in the first stroke position, here correspondingly a withdrawn position to the maximum degree. An inlet fitting clears the way to the first subvolume, such that a material flow pathway can be formed from the first step sequence to the first subvolume of the second step sequence. A (first) batch is conveyed into a first subvolume of the high pressure treatment volume Vi, for example by means of a pump or a piston.

FIG. 8C shows a process state in which the translational actuator is actuated in that it is displaced from the first stroke position to the second, with simultaneous opening/swiveling of a respective fixed flap/plate by the material flow. The batch is conveyed here by means of the respective translationally displaceable flap/plate from the first subvolume into a second subvolume (translational displacement).

FIG. 8D shows a process state in which the actuator has reached the second stroke position, here correspondingly an end position. The batch has been conveyed completely into the second subvolume, such that the first subvolume is empty. From this position, the actuator can then be displaced back.

FIG. 8E shows the backward translational stroke movement of the actuator, wherein the displaceable flaps/plates swivel and wherein the flaps/plates in a fixed arrangement block the flow. This movement corresponds to the stroke movement in the narrower sense, i.e. the part of the movement cycle in which the stroke is created in order to be able to ensure the material flow in the subsequent part of the movement cycle.

FIG. 8F shows an arrangement corresponding to that of FIG. 8B, wherein the first subvolume can be laden with a further batch 2.1. The process sequence described in FIGS. 8A to 8E may be repeated correspondingly for a respective batch.

The arrangement shown in FIGS. 8A, 8B, 8C, 8D, 8E, 8F may also be oriented in a different alignment, especially also in opposite vertical direction. Swivel joints or swivel mechanisms may optionally be actuated, for example, by means of drives and/or spring forces, especially independently of gravitational forces.

The continuity of the high pressure treatment may especially be ensured due to the high pressure treatment volume Vi kept at a high pressure level, especially in combination with cyclical translational stroke/actuating movements.

By means of the translational actuating movement which, in the working example of FIG. 8, is preferably configured as a cyclical back-and-forth movement, and which is effected along a single longitudinal axis or actuation axis L, a material flow of a multitude of batches simultaneously through the high pressure treatment volume can be assured.

The entire charge is composed of individual batches supplied to the high pressure treatment volume in the respective subvolumes.

FIGS. 9A, 9B, 9C, 9D, 9E describe an arrangement independent of gravitational forces (especially horizontal alignment of the longitudinal axis of the pressure vessel apparatus;

especially translational actuating movement in a horizontal plane), wherein the material can flow in a manner comparable to the working example of FIG. 8. In FIGS. 9C, 9D, however, the emphasis is on the discharge of material from the last subvolume. Proceeding from FIG. 9B, the batch in FIG. 9C is shown already in an arrangement in the last subvolume, with the translational actuator already in the end position (second stroke position). According to FIG. 9D, the actuator is displaced back. The stroke of the translational actuating movement (change in position) can be described here by $\Delta x$ (and in the case of an arrangement according to FIG. 8A analogously by $\Delta z$).

The arrangement according to FIG. 9A can be described as follows:
the actuator is in the first stroke position;
a multitude of (first) blocking planes on the inlet side is in the first stroke position;
a multitude of (second) fixed planes on the outlet side is in a blocking arrangement.

The term "on the inlet side" refers to a plane arranged upstream of a respective subvolume. The expression "on the outlet side" refers to a plane arranged downstream of a respective subvolume.

The arrangement according to FIG. 9B can be described as follows:
the actuator is displaced translationally from the first stroke position to the second stroke position in material flow direction;
a multitude of blocking planes on the inlet side is displaced in material flow direction, especially together with the actuator;
a multitude of fixed planes on the outlet side is in a passage arrangement.

The blocking planes push the material (batch) into the adjacent subvolume in material flow direction, with pivoting of the planes on the outlet side in a first direction of rotation.

The arrangement according to FIG. 9C can be described as follows:
the actuator is disposed in the second stroke position;
a multitude of blocking planes on the inlet side is in a blocking arrangement;
a multitude of fixed planes on the outlet side is in a passage arrangement.

The arrangement according to FIG. 9D can be described as follows:
the actuator is displaced translationally from the second stroke position back to the first stroke position counter to material flow direction (stroke movement for supply of a further batch);
a multitude of planes on the inlet side, in a passage arrangement, is displaced counter to material flow direction, especially together with or by means of the actuator;
a multitude of fixed planes on the outlet side is in a blocking arrangement.

The fixed planes are swiveled back in a second direction of rotation, back into a blocking arrangement, and the displaceable planes are displaced back and, in this backward movement, pivoted in a/the first direction of rotation.

The arrangement according to FIG. 9E corresponds essentially to that according to FIG. 8A. Displaceable and fixed planes are arranged in adjoining pairs, especially each in blocking arrangement. The material flow between the individual subvolumes can be ensured by two successive opposing stroke movements (back and forth), especially independently of the number of subvolumes arranged in series.

In the first stroke position, the displaceable planes are swiveled back in a second direction of rotation, back into a blocking arrangement; the fixed planes can then optionally be swiveled into a passage arrangement, or at least a kinematic swivel mechanism can be released, such that the fixed planes are freely swivelable and are swiveled, especially by displaced material, into the passage arrangement, in reaction to the translational actuating movement.

FIGS. 9A to 9E describe two types of planes, namely fixed planes and displaceable planes. The two kinds of planes can either be in a blocking or passage arrangement, especially blocking exclusively counter to the intended material flow direction. The blocking or passage position of the respective plane can be established, for example, by means of a kinematic swivel mechanism. In one working example, the respective plane has a multitude of swivelable or tiltable plates. The kinematic swivel mechanism may optionally have a drive or be mounted in a driveless swivelable floating manner about at least one swivel joint.

Note: the further subvolumes between the first and last subvolumes are likewise laden with material in the process stages according to FIGS. 9B to 9E, but this is not shown for the purpose of better clarity. FIG. 9B accordingly illustrates four successive translational actuating movements through the four subvolumes, proceeding from the first subvolume to the last subvolume.

FIG. 9 also show a batch cavity V21 of the high pressure treatment volume Vi, wherein the cavity V21 is isolated in a unidirectionally blocking manner.

The continuity of the high pressure treatment in the working example of FIG. 9 may be ensured in the same way as in the working example of FIG. 8.

Using the example of FIGS. 8 and 9, the material flow can also be elucidated in a more general manner: bulk material 1 is supplied as an individual batch 2.1. In the high pressure treatment volume, multiple bulk material batches 3.1, 3.2, 3.*n* give rise to the bulk material charge 3 under high pressure treatment. The bulk material flow is propagated, for example, by multiple discharged batches 4.1. At least one sensor unit 105 may be provided here, especially for temperature, pressure, force, distance, mass and/or flow rate. The respective sensor unit 105 is especially also disposed in at least one of the treatment planes 5.

FIGS. 8 and 9 illustrate the manner in which the respective treatment plane 5 can be established in an isolating state or in a passage state.

Figure 10:
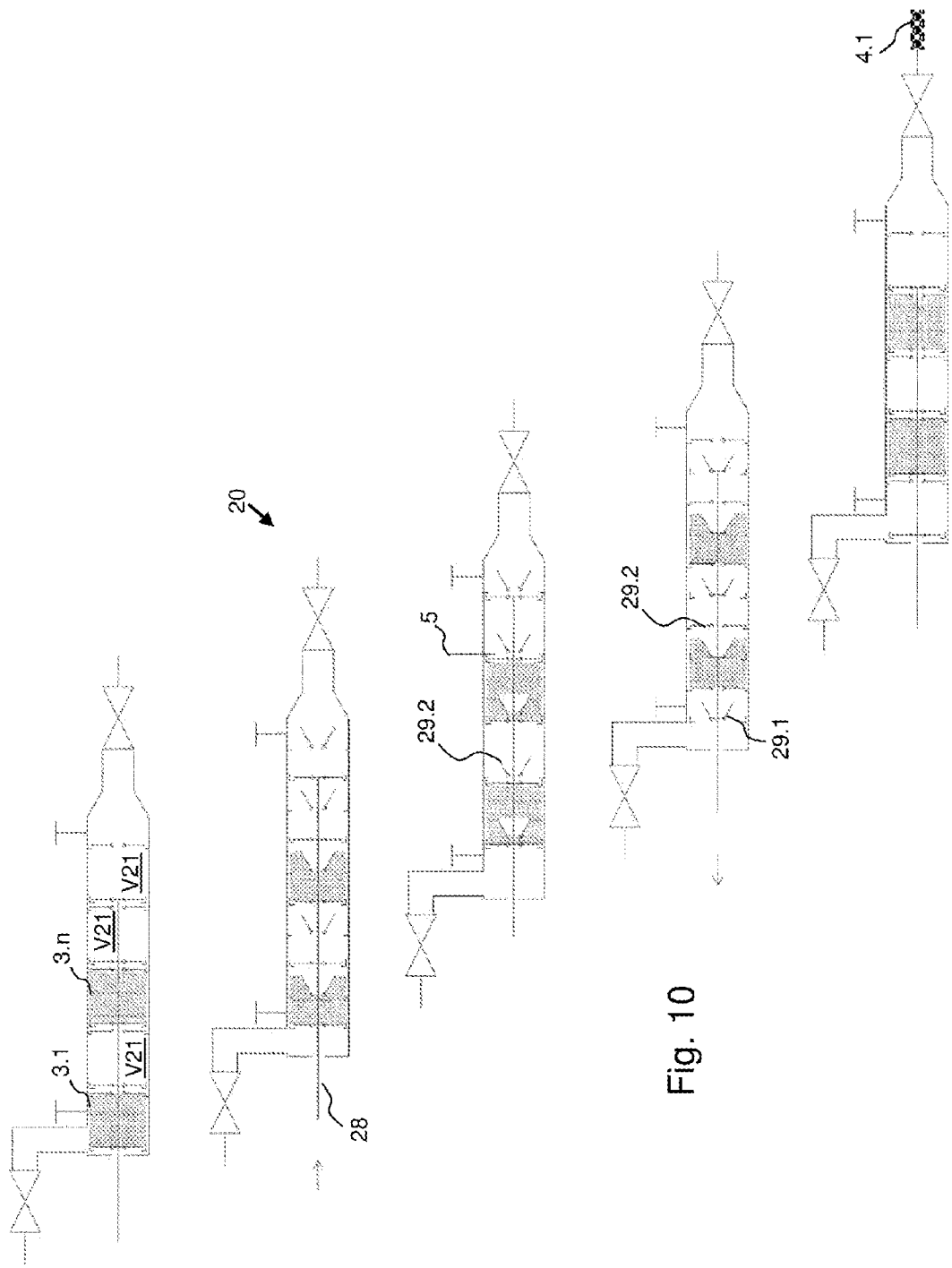
FIG. 10 is a cross-sectional side view representing successive states of operation or process stages of an example pressure vessel apparatus of a high pressure treatment arrangement.

FIG. 10 shows the concept of cyclical translational actuating movement once more in general terms, with the direction of the actuating movement in the horizontal plane merely by way of example.

With reference to FIG. 6, the displacement S2.1, as an alternative to the rotational actuating movement, may comprise at least one translational actuating movement, especially by means of at least one actuator configured as a push/pull rod, especially by means of plates coupled thereto in a swivelable manner.

LIST OF REFERENCE NUMERALS 1 bulk material or (bed of) granules
2.1 batch supplied
3 bulk material charge under high pressure treatment 3.1, 3.2, 3.n bulk material batch under high pressure treatment
4.1 batch discharged
5 high pressure treatment plane
10, 10a, 10b, 10c, 10d, 10e, 10f pressurization device
11 pressure generation means, especially pump or piston
12 inlet fitting
20, 20a, 20b, 20c, 20d, 20e, 20f, 20g, 20h, 20j, 20k, 20l, 20m, 20n pressure vessel apparatus
21 internal isolation, especially cylindrical partition
22 inlet fitting
23 high pressure-resistant wall
24 heating device, especially heating shell
25 outlet fitting
25.2 downpipe
26 in-/outflow fitting, especially with stub
27 in-/outflow fitting, especially with stub
28 rotational actuator, especially rod, shaft or pipe; or
28 translational actuator, especially push/pull rod
28.1 conveying device, especially conveying screw
29 kinematic mechanism, especially kinematic swivel mechanism; or
29; 29a, 29b (first and second) plate, partition, in each case at least partly isolating, optionally rotationally displaceable, especially configured as a circular disk; or
29; 29a, 29b (first and second) plate, partition, in each case at least partly isolating, optionally translationally displaceable, especially configured as a circular foldable or swivelable disk
29.1 passage segment
29.2 flat segment
29.3 inclined, especially conical segment
30, 30a, 30b, 30c, 30d depressurization device
31 depressurization unit
32 inlet fitting
33 piston or piston motor
35 outlet fitting
100 high pressure treatment arrangement
101 control device
103 logic unit
105 sensor unit, especially for temperature, pressure, force, distance, mass and/or flow rate
L longitudinal axis or actuation axis or actuation shaft for transmission of a torque
M1 first media stream: bulk material
M2 second media stream: high pressure medium or extraction medium, optionally comprising impregnation medium
M3 third media stream: solvent
V1 first step sequence: pressurization
S1.1 supply of bulk material as a batch/charge to a pressurization volume
S1.2 buildup of pressure in the pressurization volume, and maintaining of the pressure
S1.3 conveying the bulk material into the high pressure treatment volume
V2 second step sequence: continuous high pressure treatment comprising extraction and/or impregnation
S2.1 displacement of the bulk material in the high pressure treatment volume
S2.1a batchwise conveying of the bulk material in the high pressure volume
S2.1b continuous conveying of the bulk material in the high pressure volume
S2.1c arrangement of batches of the bulk material on one plane each
S2.2 high pressure treatment by extraction
S2.3 high pressure treatment by impregnation
S2.4 discharge of bulk material from the high pressure treatment volume
V3 third step sequence: depressurization
S3.1 supply of bulk material as a batch/charge to a depressurization volume
S3.2 pressure buildup in the depressurization volume
S3.3 discharge of bulk material from the depressurization volume
U environment
Vi fixed high pressure treatment volume in a static arrangement, or cavity for high pressure treatment sealed in a high pressure-tight manner
V21 cavity defined by isolation, especially cylindrical ring cavity; or
V21 batch cavity, especially isolated in a unidirectionally blocking manner;
x transverse axis, especially width direction
y transverse axis, especially depth direction
z upward axis, especially vertical
Δa rotational actuating movement (change in angle of rotation)
Δx, Δz translational actuating movement (change in position)
α a first swivel angle, especially upward counter to the direction of gravity
β second swivel angle, especially downward in the direction of gravity

What is claimed is:

1. A method for high pressure treatment of bulk material by extraction, wherein the bulk material is positioned in a high pressure treatment volume of a pressure vessel apparatus and is treated at a high pressure level in a range from 40 to 1000 bar under isolation from the environment, wherein the method comprises:
   pressurizing the high pressure treatment volume;
   high pressure treating the bulk material in a continuous manner at the high pressure level in the high pressure treatment volume, with continuity of the high pressure treating being assured solely by way of the high pressure treatment volume, wherein the high pressure treatment volume or the pressure vessel apparatus is in a fixed arrangement while the high pressure treating occurs, wherein during the high pressure treating discontinuous gravitational force-driven displacement of the bulk material occurs through the high pressure treatment volume by multiple discontinuous rotational or translational actuating movements, wherein the bulk material is disposed in a predefined first high pressure treatment plane and is then displaced continuously or between additional high pressure treatment planes within the high pressure treatment volume during the high pressure treating by virtue of the rotational or translational actuating movements, and wherein the bulk material is selected from polymers configured as superinsulators or aerogels;
   depressurizing the high pressure treatment volume; and
   wherein the high pressure treating comprises a continuous extraction.

2. The method of claim 1 wherein during the high pressure treating, continuous displacement or cyclical discontinuous batchwise displacement of the bulk material establishes a dwell time or a high pressure treatment time for the bulk material in the high pressure treatment volume.

3. The method of claim 1 wherein during the high pressure treating, bulk material displacement is controlled based on a size and/or cyclical supply of batches and/or charges while the bulk material is displaced continuously or in individual discontinuous batches in the high pressure treatment volume by way of the rotational actuating movements.

4. The method of claim 1 wherein the continuous extraction takes place above a critical temperature and above a critical pressure of a solvent used in the extraction.

5. The method of claim 1 comprising flowing a high pressure medium through the bulk material.

6. The method of claim 1 wherein the high pressure treating is performed at a constant high pressure or with fluctuations of pressure in a range of three to five bar inclusive.

7. The method of claim 1 wherein the translational actuating movements establish a displacement speed or cyclical discontinuous batchwise displacements that establish a dwell time or a high pressure treatment time for the bulk material in the high pressure treatment volume.

8. The method of claim 1 wherein the high pressure treating comprises discontinuous batchwise displacement of the bulk material by multiple discontinuous translational actuating movements.

9. The method of claim 1 wherein the bulk material is displaced at predefined times in the high pressure treatment volume in batches between individual ones of the high pressure treatment planes.

10. A method for high pressure treatment of bulk material by extraction, wherein the bulk material is positioned in a high pressure treatment volume of a pressure vessel apparatus and is treated at a high pressure level in a range from 40 to 1000 bar under isolation from the environment, wherein the method comprises: pressurizing the high pressure treatment volume; and high pressure treating the bulk material in a continuous manner at the high pressure level in the high pressure treatment volume, with continuity of the high pressure treating being assured solely by way of the high pressure treatment volume, wherein the high pressure treatment volume or the pressure vessel apparatus is in a fixed arrangement while the high pressure treating occurs, wherein during the high pressure treating discontinuous gravitational force-driven displacement of the bulk material occurs through the high pressure treatment volume by multiple discontinuous rotational or translational actuating movements, wherein the bulk material is disposed in a predefined first high pressure treatment plane and is then displaced continuously or between additional high pressure treatment planes within the high pressure treatment volume during the high pressure treating by virtue of the rotational or translational actuating movements, wherein the high pressure treating comprises at least one of:
continuous displacement of the bulk material in two different predefined material flow directions within the high pressure treatment volume, including in a first material flow direction defined by the rotational actuating movements and a second material flow direction defined by the translational actuating movements; or
continuous displacement of the bulk material counter to gravity by supplying potential energy to the bulk material by way of a rotational actuating movement; and
depressurizing of the high pressure treatment volume.

11. A high pressure treatment system configured for high pressure treatment of bulk material by extraction at a high pressure level in a range from 40 to 1000 bar, the high pressure treatment system comprising:

a pressurization device with pressurization generation means;
a pressure vessel apparatus coupled to the pressurization device by a high pressure-tight connection, the pressure vessel apparatus including a high pressure-resistant wall that surrounds a high pressure treatment volume for the high pressure treatment, wherein the pressure vessel apparatus includes an actuator being rotationally or translationally displaceable and configured for a rotational actuating movement or a translational actuating movement, each for gravitational force-driven displacement of the bulk material through the high pressure treatment volume during the high pressure treatment; and
a depressurization device coupled to the pressure vessel apparatus by a high pressure-tight connection,
wherein the high pressure vessel apparatus is in a fixed arrangement and is configured to a continuous high pressure treatment solely by way of the high pressure treatment volume being in a fixed arrangement and at the high pressure level,
wherein the actuator is configured to individually actuate a high pressure treatment plane of the pressure vessel apparatus or to simultaneously synchronously actuate multiple high pressure treatment planes of the pressure vessel apparatus, and wherein in the high pressure treatment volume multiple high pressure treatment planes are each defined by at least one gas-permeable plate with outflow chambers and with a passage segment.

12. The high pressure treatment system of claim 11 configured to:
supply individual batches of bulk material to the high pressure treatment volume during the high pressure treatment;
displace individual batches of bulk material within the high pressure treatment volume during the high pressure treatment; and
discharge individual batches of bulk material from the high pressure treatment volume during the high pressure treatment.

13. The high pressure treatment system of claim 11 wherein the actuator is coupled to multiple ones of the high pressure treatment planes, wherein each of the multiple high pressure treatment planes is defined by a pair of plates, wherein a first plate of the pair of plates is in a static arrangement at a fixed location and a second plate of the pair of plates is rotationally displaceable and is connected to the actuator in a rotationally fixed manner.

14. The high pressure treatment system of claim 11 wherein the actuator is configured to actuate a single plane defined by at least one plate having a segment arranged for passage of the bulk material.

15. The high pressure treatment system of claim 11 comprising feedthroughs for the lateral actuating means in a wall of the pressure vessel apparatus, wherein the lateral actuating means are coupled either
directly to respective plates or
indirectly to respective high pressure treatment planes by way of kinematic coupling.

* * * * *